(12) United States Patent
Okamura

(10) Patent No.: US 7,412,348 B2
(45) Date of Patent: Aug. 12, 2008

(54) STORAGE MEDIUM STORING A GAME PROGRAM, GAME APPARATUS, AND GAME CONTROLLING METHOD

(75) Inventor: Yuichiro Okamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 11/701,359

(22) Filed: Feb. 2, 2007

(65) Prior Publication Data

US 2008/0064109 A1 Mar. 13, 2008

(30) Foreign Application Priority Data

Sep. 13, 2006 (JP) ............................. 2006-248635

(51) Int. Cl.
*A63F 9/22* (2006.01)
(52) U.S. Cl. ...................... 702/152; 702/127; 702/150; 702/151; 702/153; 702/154; 702/155; 463/1; 463/2; 463/3; 463/4; 463/5; 463/7; 463/8; 463/30; 463/31; 463/32; 463/33; 463/36; 463/37; 463/38; 463/39; 463/40; 463/42; 463/49; 463/50
(58) Field of Classification Search ................. 463/1–5, 463/7, 8, 30–33, 36–40, 42, 49, 50; 702/127, 702/150–155
See application file for complete search history.

(56) References Cited

U.S. PATENT DOCUMENTS 6,908,386 B2 *  6/2005 Suzuki et al. ................. 463/30
6,921,332 B2 *  7/2005 Fukunaga et al. ............... 463/8
2007/0213109 A1 * 9/2007 Sato et al. ...................... 463/3

FOREIGN PATENT DOCUMENTS

JP   2002-153673   5/2002

OTHER PUBLICATIONS http://www.youtube.com/watch?v=wjLhSrSxFNw.*

* cited by examiner

*Primary Examiner*—John E Barlow, Jr.
*Assistant Examiner*—Sujoy K Kundu
(74) *Attorney, Agent, or Firm*—Nixon & Vanderhye P.C.

(57) ABSTRACT

A game system includes a game apparatus and a controller. The controller is furnished with an acceleration sensor for detecting accelerations in at least two axis directions. Game processing corresponding to the kind of an acceleration input by means of the controller is executed. For determining the kind, reference timing when acceleration in a first-axis direction is below a threshold value to take on a minimum value is detected. Then, it is determined whether or not an angle between acceleration change vectors before and after the reference timing is equal to or more than a predetermined angle. When the angle is not equal to or more than the predetermined angle, it is determined that the acceleration input is an acceleration input in any one of the two-axis directions, and when the angle is equal to or more than the predetermined angle, it is determined that the acceleration input is an acceleration input in a direction including the two-axis directions as components.

3 Claims, 20 Drawing Sheets

(A)

(B)

(A)

(B)

(A) RIGHT-HANDED CASE (B) LEFT-HANDED CASE

AXIS OF SET ACCELERATION

WHEN SECOND CONTROLLER IS HELD

CORRECT DEPENDING ON THE DIRECTION
WHEN SECOND CONTROLLER IS HELD (A) HORIZONTALLY HOLDING
(WHEN VIEWED FROM PLAYER'S SIDE)

(B) HORIZONTALLY HOLDING
(WHEN VIEWED FROM ABOVE)

(A) VERTICALLY HOLDING
(WHEN VIEWED FROM PLAYER'S SIDE)

(B) VERTICALLY HOLDING
(WHEN VIEWED FROM ABOVE)

VERTICALLY HOLDING FIRST CONTROLLER IN A STATE ROTATED ABOUT Z-AXIS
(WHEN VIEWED FROM ABOVE)

(A)  IN A CASE THAT HOOK IS THROWN (B)  IN A CASE THAT STRAIGHT IS THROWN WITH CONTROLLER ROTATED ABOUT Z-AXIS ature of the Technology
STORAGE MEDIUM STORING A GAME PROGRAM, GAME APPARATUS, AND GAME CONTROLLING METHOD

CROSS REFERENCE OF RELATED APPLICATION

The disclosure of Japanese Patent Application No. 2006-248635 is incorporated herein by reference.

BACKGROUND

1. Field of the Technology

The present technology relates to a storage medium storing a game program, a game apparatus and a game controlling method. More specifically, the technology presented herein relates to a storage medium storing a game program, a game apparatus and a game controlling method which execute game processing by taking acceleration detected by an acceleration sensor as an input.

2. Description of the Related Art

One example of a game apparatus for executing a boxing game according to a punch motion detected by means of an acceleration sensor by a player is disclosed in Document 1 (Japanese Patent Laying-open No. 2002-153673). In the technique described in Document 1, an acceleration sensor for detecting accelerations in three-axis directions, such as back and forth (Y), right and left (X) and up and down (Z) directions is provided to a glove unit as a controller. By analyzing an output waveform of the acceleration sensor, the kind of a punch is identified. More specifically, the section from the start of throwing a punch to the end of throwing the punch is detected from a waveform of the Y-axis acceleration. Next, from the waveform of each of the X-axis acceleration and the Z-axis acceleration within the section from the start of throwing a punch to the end of throwing the punch, data, such as a maximum value and a minimum value, amplitude, a peak appearing count, an integration value, etc. is extracted. Then, the kind of the punch is determined on the basis of each extracted data and each waveform pattern for each kind of punches (straight, hook, and upper punch). When the kind of the punch is identified, the game processing corresponding to the kind of the punch is performed.

However, in the technique described in Document 1, the kind of the punch is identified for each axis on the basis of the detected data and the waveform pattern, resulting in less accuracy of identification. That is, when a punch is thrown with a glove unit held in an unexpected manner, a waveform pattern different from that assumed with respect to each axis is detected, and therefore, it becomes difficult to accurately recognize the kind of the punch.

SUMMARY

Therefore, it is a primary feature of an exemplary embodiment present herein to provide a novel storage medium storing a game program, a game apparatus, and a game controlling method.

Another feature of the an exemplary embodiment is to provide a storage medium storing a game program, a game apparatus, and a game controlling method which are capable of reducing erroneous recognition of the kind of an acceleration input by means of an input means having an acceleration sensor.

The an exemplary embodiment employs the following features in order to solve the above-described problems. It should be noted that reference numerals inside the parentheses and supplement show one example of a corresponding relationship with the embodiments described later for easy understanding, and does not limit the exemplary embodiment.

A storage medium storing a game program in accordance with an exemplary embodiment is a storage medium storing a game program which causes a computer of a game apparatus including an input means having an acceleration sensor for detecting accelerations in at least two-axis directions to execute game processing in correspondence with a kind of an acceleration input by means of the input means. The game program of the storing medium causes the computer to execute an acceleration acquiring step, a reference timing detecting step, a first vector calculating step, a second vector calculating step, an angle determining step, and an input kind determining step. The acceleration acquiring step acquires accelerations detected by the acceleration sensor. The reference timing detecting step detects a reference timing indicative of timing when acceleration in a first-axis direction out of the accelerations in the two-axis directions acquired by the acceleration acquiring step is below a predetermined threshold value to take on a minimum value or is above the predetermined threshold value to take on a maximum value. The first vector calculating step calculates a first acceleration change vector on the basis of accelerations in the two-axis directions acquired at the reference timing and accelerations in the two-axis directions acquired at timing next to the reference timing. The second vector calculating step calculates a second acceleration change vector on the basis of the accelerations in the two-axis directions acquired at the reference timing and accelerations in the two-axis directions acquired at timing before the reference timing. The angle determining step determines whether or not an angle between the first acceleration change vector and the second acceleration change vector is equal to or more than a predetermined angle. The input kind determining step determines that the acceleration input is an acceleration input in any one of the two-axis directions when the angle determining step determines that the angle is not equal to or more than the predetermined angle, and determines that the acceleration input is an acceleration input in a direction including the two-axis directions as components when the angle determining step determines that the angle is equal to or more than the predetermined angle.

More specifically, the game program is a program for causing a computer (44) of a game apparatus (12) to execute steps described below, and execute game processing in correspondence with the kind of an acceleration input. The game apparatus includes an input means (14, 34, 36) operated by a player, and the input means has an acceleration sensor for detecting accelerations in at least two-axis directions (84, 90). The accelerations detected by the acceleration sensor are acquired by an acceleration acquiring step (S3, S15). A reference timing indicating timing that a predetermined condition is satisfied is detected on the basis of the acquired accelerations by a reference timing detecting step (S91, S93). More specifically, the reference timing is timing when acceleration in a first-axis direction out of the accelerations in the two-axis directions is below a predetermined threshold value to take on a minimum value. Or, the reference timing is timing when acceleration in a first-axis direction out of the accelerations in the two-axis directions is above a predetermined threshold value to take on a maximum value. The predetermined condition for detecting the reference timing is determined by setting the first-axis direction of the acceleration sensor. There appears a difference in the angle between the acceleration change vectors before and after the reference timing in correspondence with the kind of the acceleration input independent of how to hold the input means by the player, and therefore, the acceleration input is identified by the determination of the angle. That is, in a first vector calculating step (S95), a first acceleration change vector (V1) is calculated on the basis of accelerations in the two-axis directions acquired at the reference timing and the timing next to the reference timing. In a second vector calculating step (S97), a second acceleration change vector (V2) is calculated on the basis of accelerations in the two-axis directions acquired at the reference timing and the timing before the reference timing. In an angle determining step (S99), it is determined whether or not an angle (θ) between the first acceleration change vector and the second acceleration change vector is equal to or more than a predetermined angle. An input kind determining step (S101) determines that the acceleration input is an acceleration input in any one of the two-axis directions when it is determined that the angle is not equal to or more than the predetermined angle, and determines the acceleration input is an acceleration input in a direction including the two-axis directions as components when it is determined that the angle is equal to or more than the predetermined angle.

According to an exemplary embodiment, the kind of the acceleration input is identified depending on the relationship between the angle between the acceleration change vectors before and after the reference timing and the predetermined angle. Thus, it is possible to accurately discriminate whether the kind of the acceleration input is a linear acceleration input in one of the two-axis directions, or an acceleration input in a direction including the two-axis directions as components.

A game apparatus in accordance with another exemplary embodiment is a game apparatus which includes an input means having an acceleration sensor for detecting accelerations in at least two-axis directions, and executes game processing in correspondence with a kind of an acceleration input by means of the input means. The game apparatus comprises an acceleration acquiring means, a reference timing detecting means, a first vector calculating means, a second vector calculating means, an angle determining means, and an input kind determining means. The acceleration acquiring means acquires accelerations detected by the acceleration sensor. The reference timing detecting means detects a reference timing indicative of timing when acceleration in a first-axis direction out of the accelerations in the two-axis directions acquired by the acceleration acquiring means is below a predetermined threshold value to take on a minimum value or is above the threshold value to take on a maximum value. The first vector calculating means calculates a first acceleration change vector on the basis of accelerations in the two-axis directions acquired at the reference timing and accelerations in the two-axis directions acquired at timing next to the reference timing. The second vector calculating means calculates a second acceleration change vector on the basis of the accelerations in the two-axis directions acquired at the reference timing and accelerations in the two-axis directions acquired at timing before the reference timing. The angle determining means determines whether or not an angle between the first acceleration change vector and the second acceleration change vector is equal to or more than a predetermined angle. The input kind determining means determines that the acceleration input is an acceleration input in any one of the two-axis directions when the angle determining means determines that the angle is not equal to or more than the predetermined angle, and determines that the acceleration input is an acceleration input in a direction including the two-axis directions as components when the angle determining means determines that the angle is equal to or more than the predetermined angle.

Another exemplary embodiment is a game apparatus which corresponds to the storage medium storing a game program of the above-described exemplary embodiment, and has an advantage similar to that.

A game controlling method in accordance with still another exemplary embodiment is a game controlling method for executing game processing according to a kind of an acceleration input by means of an input means in a game apparatus including the input means having an acceleration sensor for detecting accelerations in at least two-axis directions. The game controlling method includes an acceleration acquiring step, a reference timing detecting step, a first vector calculating step, a second vector calculating step, an angle determining step, and an input kind determining step. The acceleration acquiring step acquires accelerations detected by the acceleration sensor. The reference timing detecting step detects a reference timing indicative of timing when acceleration in a first-axis direction out of the accelerations in the two-axis directions acquired by the acceleration acquiring step is below a predetermined threshold value to take on a minimum value or is above the predetermined threshold value to take on a maximum value. The first vector calculating step calculates a first acceleration change vector on the basis of accelerations in the two-axis directions acquired at the reference timing and accelerations in the two-axis directions acquired at timing next to the reference timing. The second vector calculating step calculates a second acceleration change vector on the basis of the accelerations in the two-axis directions acquired at the reference timing and accelerations in the two-axis directions acquired at timing before the reference timing. The angle determining step determines whether or not an angle between the first acceleration change vector and the second acceleration change vector is equal to or more than a predetermined angle. The input kind determining step determines that the acceleration input is an acceleration input in any one of the two-axis directions when the angle determining step determines that the angle is not equal to or more than the predetermined angle, and determines the acceleration input is an acceleration input in a direction including the two-axis directions as components when the angle determining step determines that the angle is equal to or more than the predetermined angle.

The still another exemplary embodiment is a game controlling method which corresponds to the storage medium storing a game program in the above-described exemplary embodiment, and has an advantage similar to that.

According to the an exemplary embodiment presented herein, it is possible to reduce erroneous recognition due to how to hold the input means in the game apparatus including the input means furnished with the acceleration sensor for detecting at least accelerations in the two axis directions.

The above described features, aspects and advantages of the an exemplary embodiment will become more apparent from the following detailed description when taken in conjunction with the accompanying drawings.

DETAILED DESCRIPTION OF THE PREFERRED EMBODIMENTS

Figure 1:
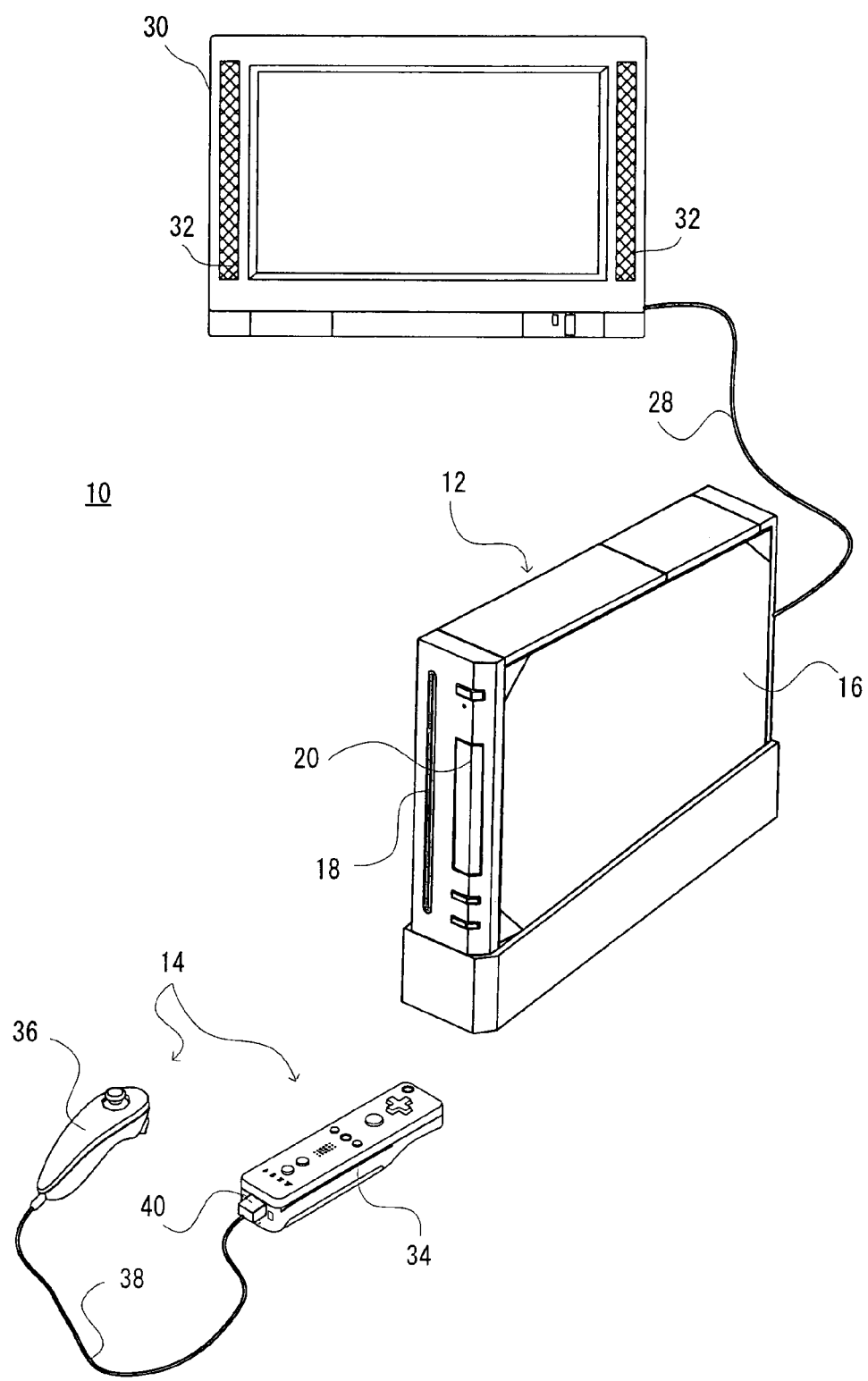
FIG. 1 is an appearance view showing an outline of a game system in accordance with one embodiment.

Referring to FIG. 1, a game system 10 in accordance with one embodiment includes a game apparatus 12 and a controller 14. The game apparatus 12 is a game console. The controller 14 is an input device or an operation device for a user or a player. The game apparatus 12 and the controller 14 are connected with each other by radio.

The game apparatus 12 includes a roughly rectangular parallelepiped housing 16, and the housing 16 is furnished with a disk slot 18 and a memory card slot cover 20 on a front surface. An optical disk 22 (see FIG. 2) as one example of an information storage medium storing game program and data, etc. is inserted from the disk slot 18 to be loaded into a disk drive 24 (see FIG. 2) within the housing 16. Inside the memory card slot cover 20 is provided a memory card slot through which an external memory card 26 (FIG. 2) is inserted. The memory card 26 is employed for loading the game program, etc. read from the optical disk 22 (FIG. 2) to temporarily store it, storing (saving) game data (result data or proceeding data of the game) of the game played by means of the game system 10, and so forth. It should be noted that storing the game data described above may be performed on an internal memory such as a flash memory, etc in place of the external memory card 26.

The game apparatus 12 has an AV cable connector (not illustrated) on a rear surface of the housing 16, and by means of the connector, the game apparatus 12 is connected to a monitor (display) 30 via an AV cable 28. The monitor 30 is typically a color television receiver, and through the AV cable 28, a video signal from the game apparatus 12 is input to a video input terminal of the color television, and a sound signal is input to a sound input terminal thereof. Accordingly, a game image of a three-dimensional (3D) video game, for example, is displayed on the screen of the color television (monitor) 30, and a stereo game sound, such as a game music, a sound effect, etc. is output from integrated speakers 32.

Furthermore, the power of the game apparatus 12 is applied by means of a general AC adapter (not illustrated). The AC adapter is inserted into a standard wall socket for home use, and transforms the house current to a low DC voltage signal suitable for driving the game apparatus 12. In another embodiment, a battery may be utilized as a power supply.

The controller 14, which is described in detail later, includes a first controller 34 and a second controller 36 each capable of being held with one hand. A cable 38 has one end extending from the rear end of the second controller 36 and the other end provided with a connector 40. The connector 40 is connected to a connector 42 (FIG. 3, FIG. 5) provided on a rear end surface of the first controller 34. Operation data or input data of the second controller 36 is applied to the first controller 34 through the cable 38. The first controller 34 transmits controller data including the input data of the first controller 34 itself and the input data of the second controller 36.

In the game system 10, a user turns the power of the game apparatus 12 on for playing the game (or other applications), then selects an appropriate optical disk 22 storing a video game (or other applications the player wants to play), and loads the optical disk 22 into the disk drive 24 through the disk slot 18 of the game apparatus 12. In response thereto, the game apparatus 12 starts to execute a video game or other applications on the basis of the software stored in the optical disk 22. The user operates the controller 14 in order to apply an input to the game apparatus 12.

Figure 2:
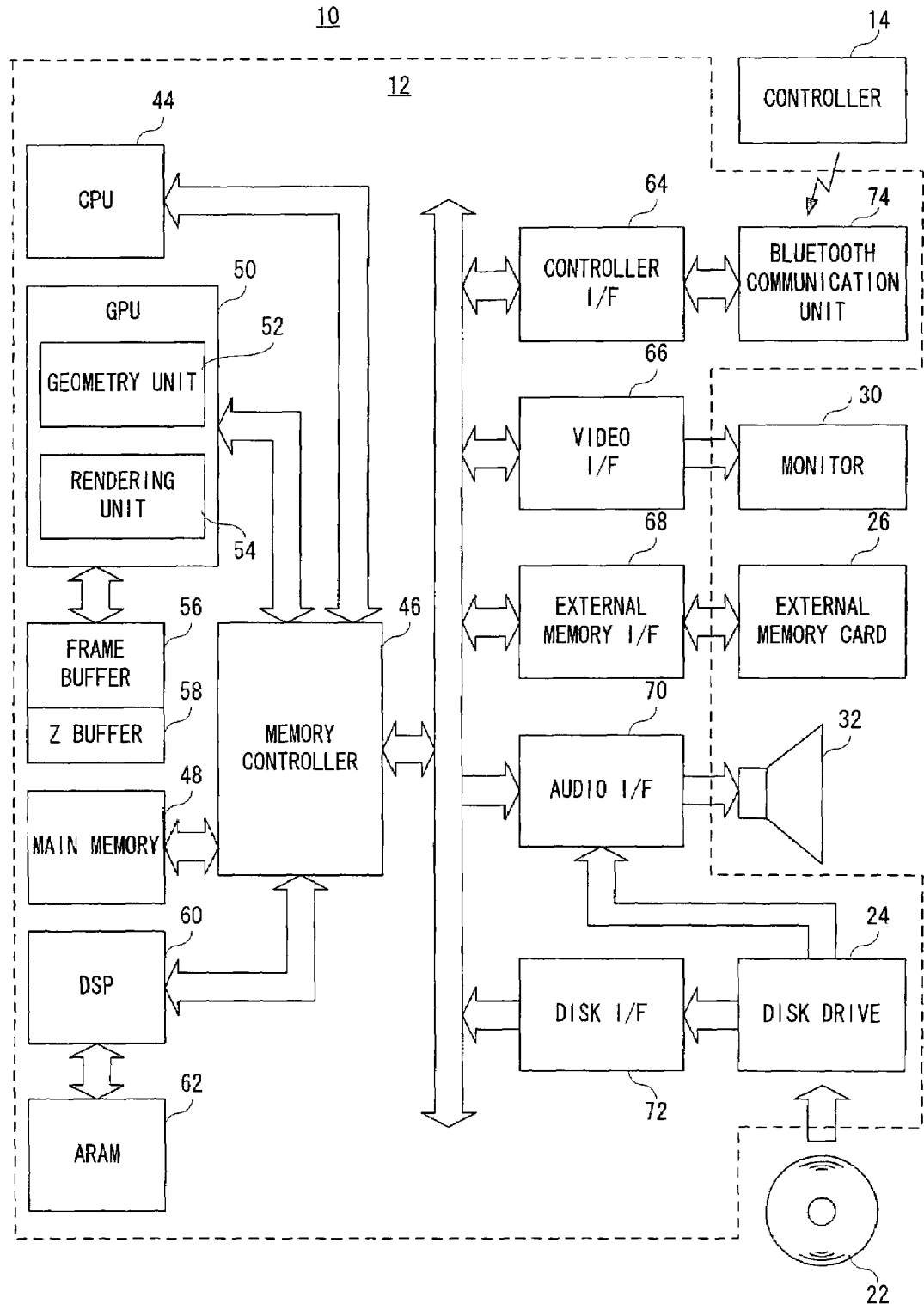
FIG. 2 is a block diagram showing one example of an electric configuration of the game system.

FIG. 2 is a block diagram showing an electric configuration of the game system 10. The game apparatus 12 includes a CPU 44. The CPU 44 functions as a game processor, and is in charge of an overall control of the game apparatus 12. The CPU 44 is connected with a memory controller 46 via a bus. The memory controller 46 mainly controls writing and reading of a main memory 48 connected via a bus under the control of the CPU 44. The memory controller 46 is connected with a GPU (Graphics Processing Unit) 50.

The GPU 50 forms a part of a rendering means, and is constituted by a single chip ASIC, for example, receives a graphics command (rendering command) from the CPU 44 via the memory controller 46, and by following the command thus received, generates a 3D game image by a geometry unit 52 and a rendering unit 54. Namely, the geometry unit 52 performs arithmetic processing of rotation, movement, and deformation, etc, of each kind of object of a three dimensional coordinate system. The object is formed of a plurality of polygons (the polygon here refers to a polygonal plane defined by at least three vertexes coordinates.) The rendering unit 54 performs image generation processing such as attaching a texture (texture image) to each polygon of each kind of object, and so forth. Accordingly, 3D image data to be displayed on the game screen is generated by the GPU 50, and the image data is stored in a frame buffer 56.

Note that necessary data (primitive or polygon and texture, etc) required to execute the graphics command by the GPU 50 is obtained from the main memory 48 via the memory controller 46 by the GPU 50.

The frame buffer 56 is a memory for drawing (accumulating) one frame of image data of a raster scan monitor 30, for example, and is overwritten for every frame by the GPU 50. Specifically, the frame buffer 56 sequentially stores chromatic information of an image for each pixel. Here, the chromatic information refers to data on R, G, B and A, and corresponds to R (red) data of 8 bits, G (green) data of 8 bits, B (blue) data of 8 bits, and A (alpha) data of 8 bits, for example. Note that A data is the data on a mask (mat image). Additionally, a video I/F 66 to be described later reads the data in the frame buffer 56 via the memory controller 46 to thereby display a game image on the monitor 30.

In addition, a Z buffer 58 has a storage capacity (the number of pixels corresponding to the frame buffer 56× the number of bits of the depth data per one pixel), and stores depth information or depth data (Z value) of dots corresponding to each storage location of the frame buffer 56.

Both of the frame buffer 56 and the Z buffer 58 may be constituted by using one portion of the main memory 48, and also these buffers may be provided inside the GPU 50.

The memory controller 46 is furthermore connected to a RAM for audio (referred to as "ARAM" hereafter) 62 via a DSP (Digital Signal Processor) 60. Accordingly, the memory controller 46 controls writing and/or reading of the ARAM 62 as a sub-memory as well as that of the main memory 48.

The DSP 60 works as a sound processor, and generates audio data corresponding to sound, voice or music necessary for the game, by using sound data stored in the main memory 48 and by using sound wave (tone) data written in the ARAM 62.

The memory controller 46 is further connected to respective interfaces (I/F) 64, 66, 68, 70, and 72 by the bus. The controller I/F 64 is an interface for the controller 14 connected to the game apparatus 12 via a Bluetooth communication unit 74. More specifically, the Bluetooth communication unit 74 is a communication device for the main body, and receives controller data (input data) sent from a radio module 76 (FIG. 5), that is, a communication device of the controller 14. The controller I/F 64 applies the controller data received through the Bluetooth communication unit 74 to the CPU 44 through the memory controller 46. The video I/F 66 accesses the frame buffer 56 to read the image data generated by the GPU 50, and applies the image signal or the image data (digital RGBA pixel value) to the monitor 30 via the AV cable 28 (FIG. 1).

The external memory I/F 68 associates the external memory card 26 to be inserted into the front surface of the game apparatus 12 with the memory controller 46. Whereby, the CPU 44 can write the data into the external memory card 26, or can read out the data from the external memory card 26, via the memory controller 46. The audio I/F 70 receives audio data given from the DSP 60 or an audio stream read from the optical disk 22, through the memory controller 46, and gives audio signals (sound signal) corresponding thereto to the speakers 32 of the monitor 30.

The disk I/F 72 connects the disk drive 24 to the memory controller 46 to thereby allow the CPU 44 to control the disk drive 24. The program and data read out from the optical disk 22 by this disk drive 24 are written into the main memory 48 under the control of the CPU 44. The CPU 44 executes a process for the game or the application according to this program.

Figure 3:
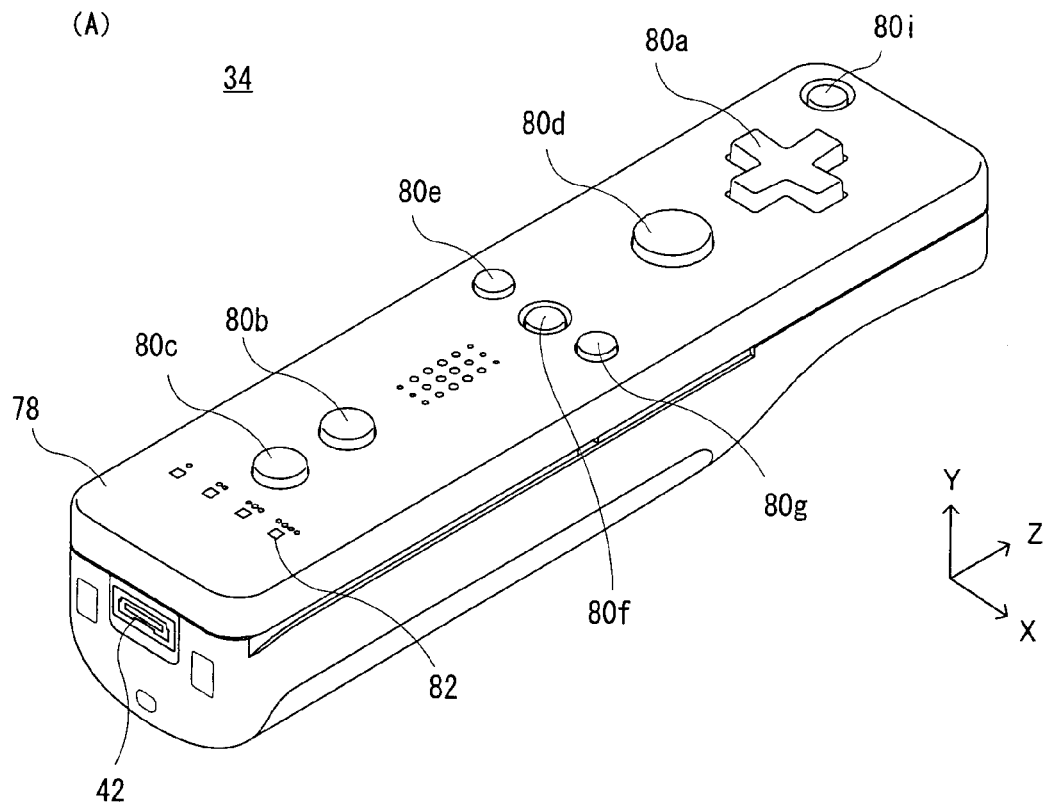
FIG. 3 is an illustrative view showing one example of an appearance of a first controller, FIG. 3 (A) is a perspective view viewed from above rear, and FIG. 3 (B) is a perspective view viewed from below front.
Figure 3:
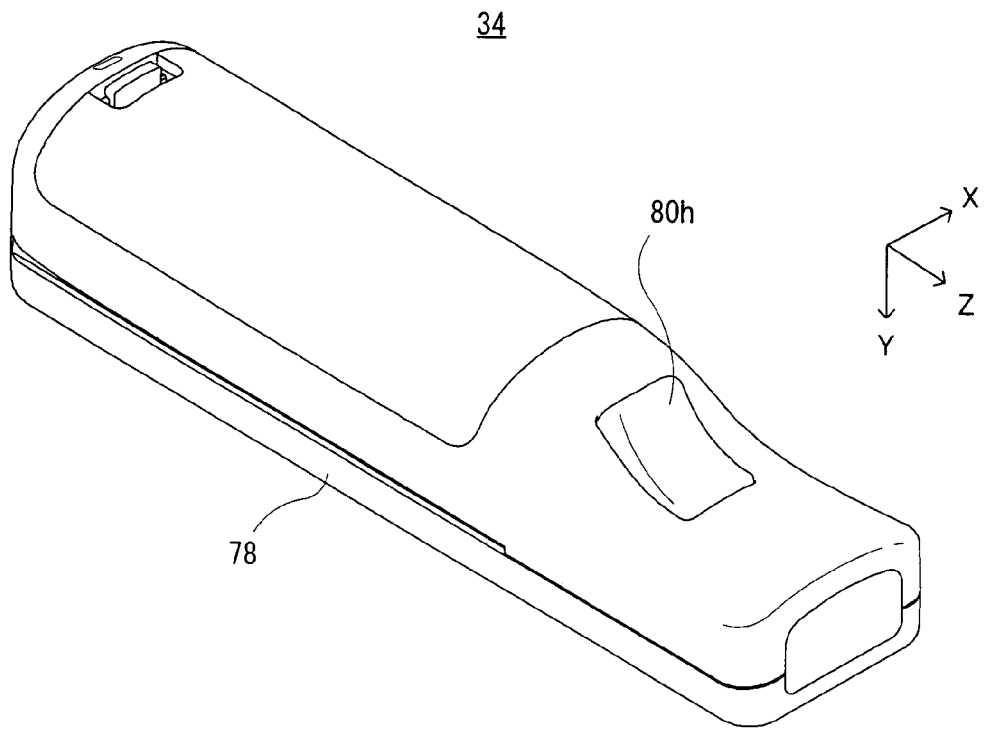

FIG. 3 shows one example of an external appearance of the first controller 34. FIG. 3 (A) is a perspective view viewing the first controller 34 from above rear, and FIG. 3 (B) is a perspective view viewing the first controller 34 from below front.

The first controller 34 has a housing 78 formed by plastic molding, for example. The housing 78 is formed into an approximately rectangular parallelepiped shape regarding a back and forth direction (Z-axis direction shown in FIG. 3) as a longitudinal direction, and has a size small enough to be held by one hand of a child and an adult. As one example, the housing 78 has a length or a width approximately the same as that of the palm of the person. A player can perform a game operation by means of the first controller 34, that is, by pushing buttons provided on it and by changing a position and a direction of the first controller 34 itself.

The housing 78 is provided with a plurality of operation buttons. That is, on the top surface of the housing 78, a cross key 80a, an X button 80b, a Y button 80c, an A button 80d, a select switch 80e, a menu switch 80f, and a start switch 80g are provided. Meanwhile, on the bottom surface of the housing 78, a concave portion is formed, and on the reward inclined surface of the concave portion, a B button 80h is provided. Each of the buttons (switches) 80a-80h is assigned an appropriate function according to a game program to be executed by the game apparatus 12. Furthermore, the housing 78 has a power switch 80i for turning on/off the power of the main body of the game apparatus 12 on a top surface from a remote place. The respective buttons (switches) provided on the first controller 34 may inclusively be indicated with the use of the reference numeral 80.

At the back surface of the housing 78, the above-described connector 42 is provided. The connector 42 is a 32 pin edge connector, for example, and utilized for connecting other devices to the first controller 34. In this embodiment, the connector 42 is connected with the connector 40 of the second controller 36. At the back end of the top surface of the housing 78, a plurality of LEDs 82 are provided, and the plurality of LEDs 82 show a controller number (identification number of the controller) of the controller 14. The game apparatus 12 can be connected with a maximum four controllers 14, for example. If a plurality of controllers 14 are connected to the game apparatus 12, a controller number is applied to the respective controllers 14 in the order connected, for example. Each LED 82 corresponds to a controller number, and the LED 82 corresponding to the controller number lights up.

Furthermore, inside the housing 78 of the first controller 34, an acceleration sensor 84 (FIG. 5) is provided. As an acceleration sensor 84, acceleration sensors of an electrostatic capacity type can typically be utilized. The acceleration sensor 84 detects accelerations of a linear component for each sensing axis and gravitational acceleration out of the accelerations applied to a detection portion of the acceleration sensor. The acceleration sensor 84 detects accelerations of at least two axes which are orthogonal with each other. For the two-axis or three-axis acceleration sensor, for example, the acceleration applied to the detection portion of the acceleration sensor is detected as accelerations of linear components along the respective axes. More specifically, in this embodiment, a three-axis acceleration sensor is applied to detect the respective accelerations in directions of three axes of a up and down direction (Y-axial direction shown in FIG. 3), a right and left direction (X-axial direction shown in FIG. 3), and a forward and rearward direction (Z-axial direction shown in FIG. 3) of the first controller 34. The acceleration detected for each axis of the acceleration sensor 84 is subjected to a predetermined arithmetic process, to thereby calculate a slope and a rotation of the first controller 34. For example, gravitational acceleration is constantly applied even in a state that the acceleration sensor 84 stands still, and acceleration corresponding to a slope of each axis with respect to the gravitational acceleration is detected for each axis. More specifically, when the acceleration sensor 84 stands still in a horizontal state (that is, X and Z-axis directions are a horizontal direction, and a Y-axis direction is a vertical direction), the gravitational acceleration of 1 G is applied to the Y-axis of the acceleration sensor 84, and the gravitational accelerations to the other X and Z-axes are 0. When the acceleration sensor 84 is sloped from the horizontal state, the gravitational acceleration is distributed into each axis of the acceleration sensor 84 depending on angles formed by each axis direction of the acceleration sensor 84 and the gravitational direction, and at this time, an acceleration value of each axis of the acceleration sensor 84 is detected. An arithmetic operation is performed on the acceleration value for each axis, to thereby calculate the orientation of the acceleration sensor 84 with respect to the direction of the gravitational acceleration.

It should be noted that as an acceleration sensor 84, two-axis acceleration sensors may be utilized for detecting any two of the directions of the accelerations out of the up and down direction, the right and left direction and the back and forth direction according to the shape of the housing 78, the limitation on how to hold the first controller 34, or the like.

Figure 4:
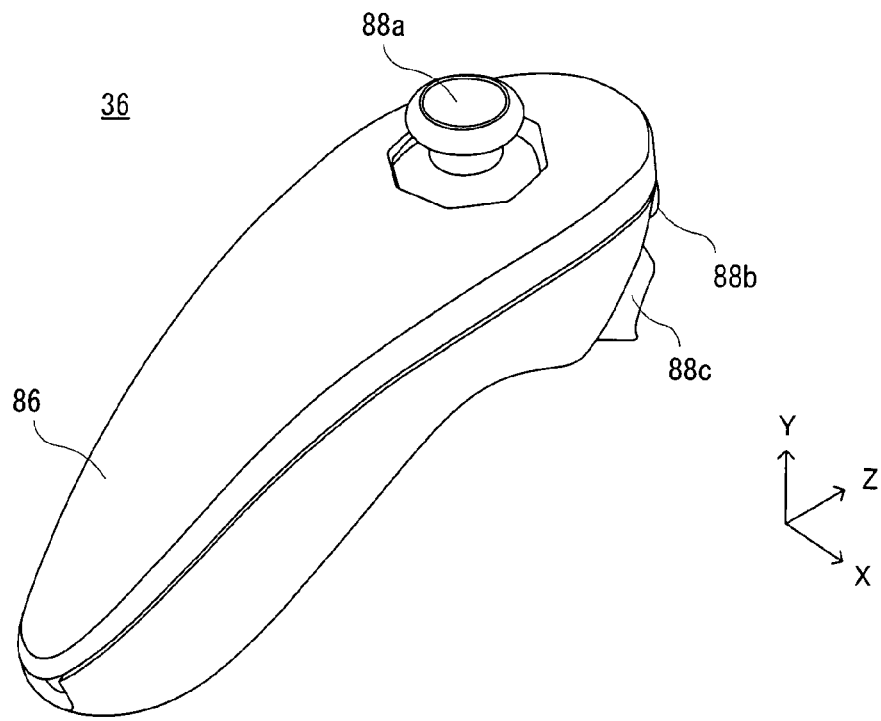
FIG. 4 is an illustrative view showing one example of an appearance of a second controller, FIG. 4 (A) is a perspective view viewed from above rear, and FIG. 4 (B) is a perspective view viewed from below front.
Figure 4:
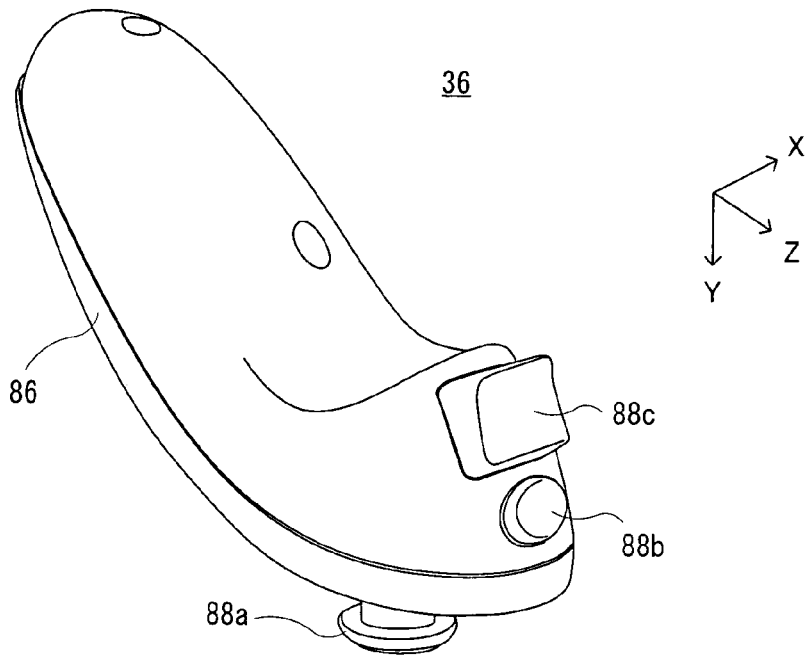

FIG. 4 shows one example of an appearance of the second controller 36. FIG. 4 (A) is a perspective view when viewing the second controller 36 from above rear, and FIG. 4 (B) is a perspective view when viewing the second controller 36 from below front. Additionally, in FIG. 4, the cable 38 of the second controller 36 is omitted.

The second controller 36 has a housing 86 formed by plastic molding, for example. The housing 86 is formed into an approximately thin long elliptical shape when viewed from plane (Z-axis direction in FIG. 4), and the width of the right and left direction (X-axis direction in FIG. 4) at the back end is narrower than that of the front end. Furthermore, the housing 86 has a curved shape as a whole when viewed from a side, and downwardly curved from a horizontal portion at the front end to the back end (see FIG. 8). The housing 86 has a size small enough to be held by one hand of a child and an adult similar to the first controller 34 as a whole, and has a longitudinal length (in the Z-axis direction) slightly shorter than that of the housing 78 of the first controller 34. Even with the second controller 36, the player can perform a game operation by operating buttons and a stick, and by changing a position and a direction of the controller itself.

At the end of the top surface of the housing 86, an analog joystick 88a is provided. At the end of the housing 86, a front edge slightly inclined backward is provided, and on the front edge is provided a Z button 88b and a C button 88c vertically arranged (Y-axis direction in FIG. 4). The analog joystick 88a and the respective buttons 88b and 88c are assigned appropriate functions according to a game program to be executed by the game apparatus 12. The analog joystick 88a and the respective buttons 88b and 88c provided to the second controller 36 may be inclusively denoted by means of the reference numeral 88.

Inside the housing 86 of the second controller 36, an acceleration sensor 90 (FIG. 5) is included. As the acceleration sensor 90, an acceleration sensor similar to the acceleration sensor 84 in the first controller 34 is applied. More specifically, the three-axis acceleration sensor is applied, and detects the respective accelerations in the directions of three axes of an up and down direction (Y-axial direction shown in FIG. 4), a right and left direction (X-axial direction shown in FIG. 4), and a forward and rearward direction (Z-axial direction shown in FIG. 4) of the second controller 36. Accordingly, similar to the first controller 34, the acceleration detected for each axis is subjected to an appropriate arithmetic process to thereby calculate a slope and a rotation of the second controller 36 and an orientation of the acceleration sensor 90 with respect to the direction of gravity.

Additionally, the shapes of the first controller 34 shown in FIG. 3 and the second controller 36 shown in FIG. 4 and the shape, the number and the setting position of the buttons (switches, stick, or the like) are merely one example, and can be changed to other shapes, numbers and setting positions, etc. as needed.

Furthermore, the controller 14 is powered by a battery (not illustrated) detachably incorporated in the first controller 34. The second controller 36 is powered through the connector 42, the connector 40, and the cable 38.

Figure 5:
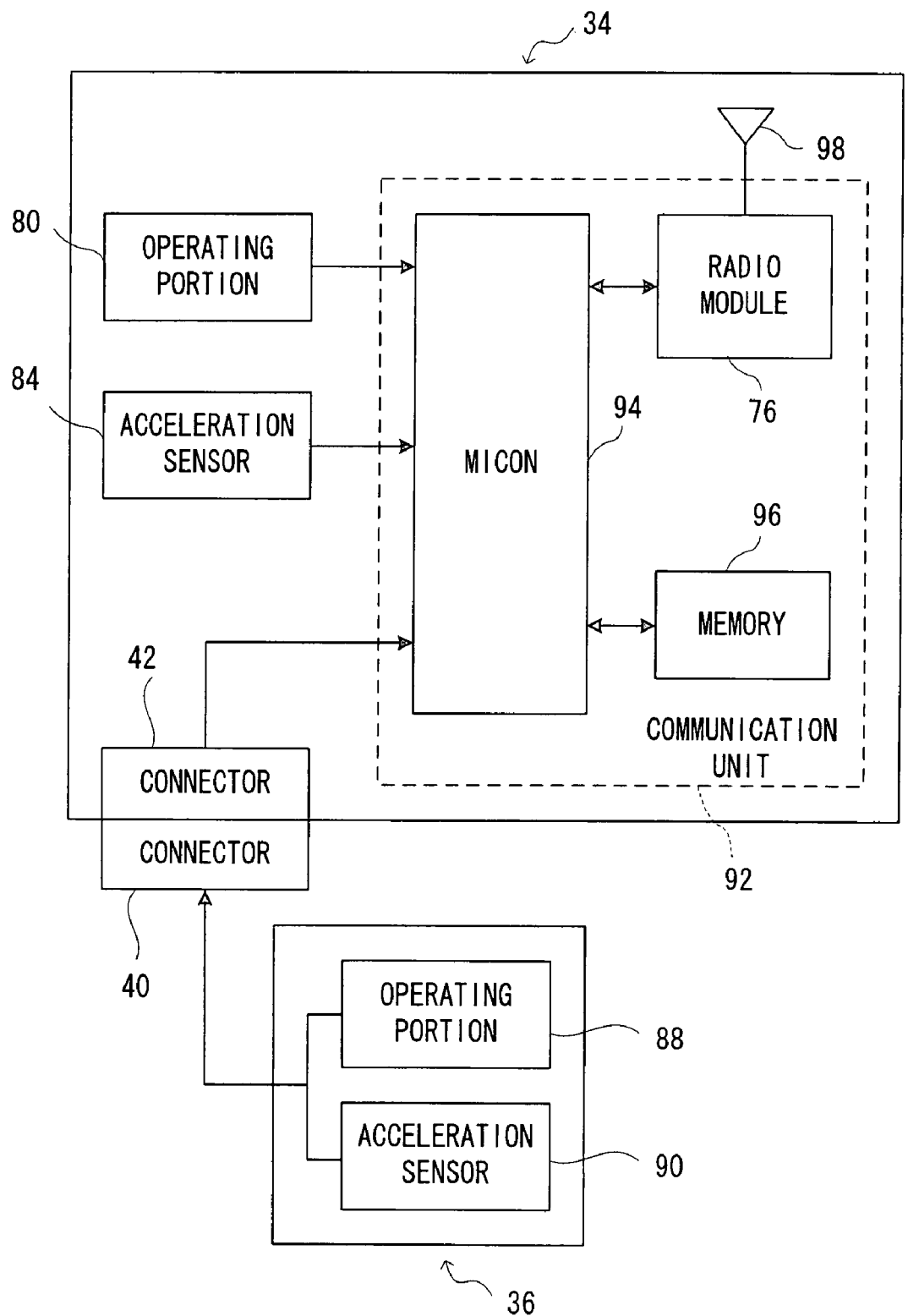
FIG. 5 is a block diagram showing one example of an electric configuration of a controller.

FIG. 5 shows one example of an electric configuration of the controller 14 when the first controller 34 and the second controller 36 are connected with each other.

The first controller 34 incorporates a communication unit 92, and the communication unit 92 is connected with the operating portion 80, the acceleration sensor 84, and the connector 42. The operating portion 80 indicates the above-described operation buttons or operating switches 80a-80i. When the operating portion 80 is operated, a manipulate signal is applied to the communication unit 92.

The data indicative of acceleration detected by the acceleration sensor 84 is output to the communication unit 92. The acceleration sensor 84 has in the order of a maximum sampling period of 200 frames per second.

The connector 42 is connected with the connector 40 of the cable 38 extending from the second controller 36. The connector 40 is connected with the operating portion 88 and the acceleration sensor 90 of the second controller 36. The operating portion 88 denotes the above-described joystick 88a and operation buttons 88b and 88c. When the operating portion 88 is operated, a manipulate signal is applied to the communication unit 92 via the cable 38, the connector 40, the connector 42, etc. The acceleration sensor 90 also has a sampling period similar to that of the acceleration sensor 84, and applies the data indicative of the detected acceleration to the communication unit 92.

The communication unit 92 includes a microcomputer (micon) 94, a memory 96, a radio module 76 and an antenna 98. The micon 94 transmits the obtained data to the game apparatus 12 and receives data from the game apparatus 12 by controlling the radio module 76 while using the memory 96 as a memory area (working area and buffer area) in processing.

The data output from the operating portion 80 and the acceleration sensor 84, and the operating portion 88 and the acceleration sensor 90 to the micon 94 is temporarily stored in the memory 96. The radio transmission from the communication unit 92 to the Bluetooth communication unit 74 of the game apparatus 12 is performed every predetermined cycle. The game processing is generally performed by regarding 1/60 seconds as a unit, and therefore, it is necessary to perform the transmission from the first controller 34 at a cycle equal to or shorter than it. The micon 94 outputs data including the operation data of the operating portions 80 and 88 and the acceleration data of the acceleration sensors 84 and 90 stored in the memory 96 to the radio module 76 as controller data when transmission timing to the game apparatus 12 has come. The radio module 76 modulates a carrier of a predetermined frequency by the controller data, and emits its weak radio wave signal from the antenna 98 by using a short-range wireless communication technique, such as Bluetooth™. Namely, the controller data is modulated to the weak radio wave signal by the radio module 76 and transmitted from the first controller 34. The weak radio wave signal is received by a Bluetooth communication unit 74 of the game apparatus 12. The weak radio wave thus received is subjected to demodulating and decoding processing, thus making it possible for the game apparatus 12 to obtain the controller data. The CPU 44 of the game apparatus 12 performs the game processing on the basis of the controller data obtained from the controller 14. The radio communication between the first controller 34 and the game apparatus 12 may be executed according to other standards, such as a wireless LAN, etc.

In the game system 10, the player can perform an operation or an input to the game by moving the controller 14. The controller 14 is furnished with a motion sensor for detecting the motion of its own, and the motion sensor detects motion information. More specifically, as described above, the first controller 34 is integrated with the acceleration sensor 84 for detecting accelerations in at least two-axis directions, and the second controller 36 is integrated with the acceleration sensor 90 similar to the first controller 34. When the controller 14 is moved by the player, accelerations in accordance with the motion are detected. In the game apparatus 12, the game processing is executed according to the detected accelerations. In other words, the player can input accelerations to the game apparatus 12 by appropriately moving the controller 14. In the game apparatus 12, the game processing is executed in response to the acceleration input. More specifically, in the game apparatus 12, an operation and an input motion by the player is determined on the basis of the detected acceleration. That is, the kind and the direction of the acceleration input are identified to execute the game processing corresponding to the kind and the direction of the acceleration input. For example, an image in which an object makes a motion corresponding to the kind and the direction of the acceleration input is displayed.

In this embodiment, a description is made on a case that the game system 10 is applied to a boxing game. A player holds the first controller 34 with the dominant hand and holds the second controller 36 with the other hand, and can play the boxing game by performing a punching motion with any one of the left and right arms. More specifically, in the game apparatus 12, the kind of the punch motion, that is, the kind and the direction of the acceleration input are determined on the basis of acceleration data detected in response to the punching motion by the player. In this embodiment, two types of the punch motion of a hook and a straight are identified on the basis of the acceleration. The game processing in association with the identified kind is executed. For example, when the player throws a hook by any one of the arms, a player character makes an action like throwing a hook with the same hand on the game screen. Or, the motion of the glove of the same side is controlled such that the glove moves along a path of the hook. On the other hand, when the player throws a straight by any one of the arms, the player character makes an operation like throwing a straight by the same arm on the game screen. Or, the motion of the glove on the same side is controlled such that the glove moves along a path of the straight.

Figure 6:
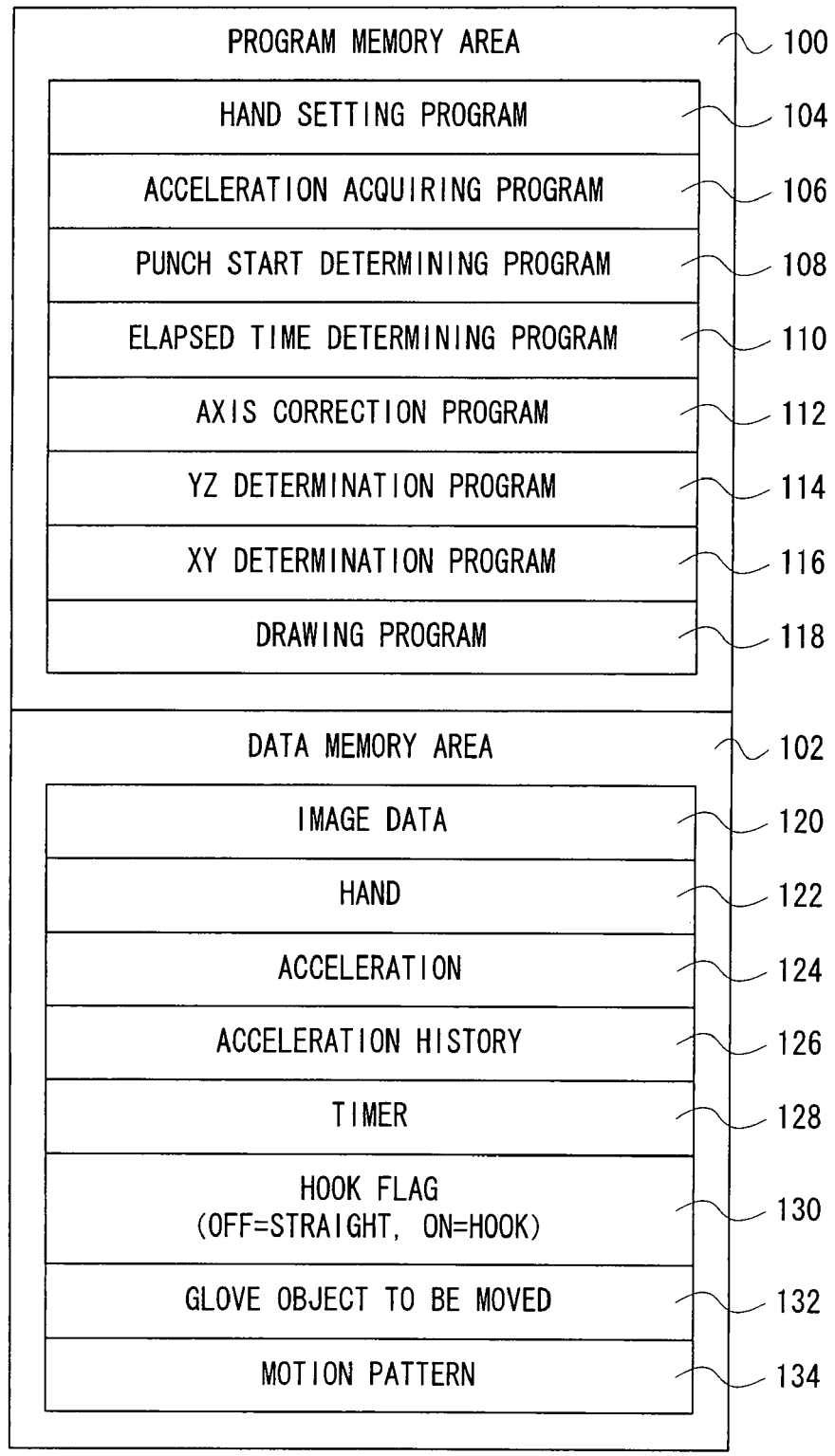
FIG. 6 is an illustrative view showing one example of a memory map.

FIG. 6 shows one example of a memory map when the boxing game in the embodiment is executed. The main memory 48 includes a program memory area 100 and a data memory area 102. Parts of the program and the data are read entirely at a time or partially and sequentially from the optical disk 22 and stored in the main memory 48. Additionally, in FIG. 6, only the part of the memory map is illustrated, and other programs and data required for processing are also stored.

Figure 7:
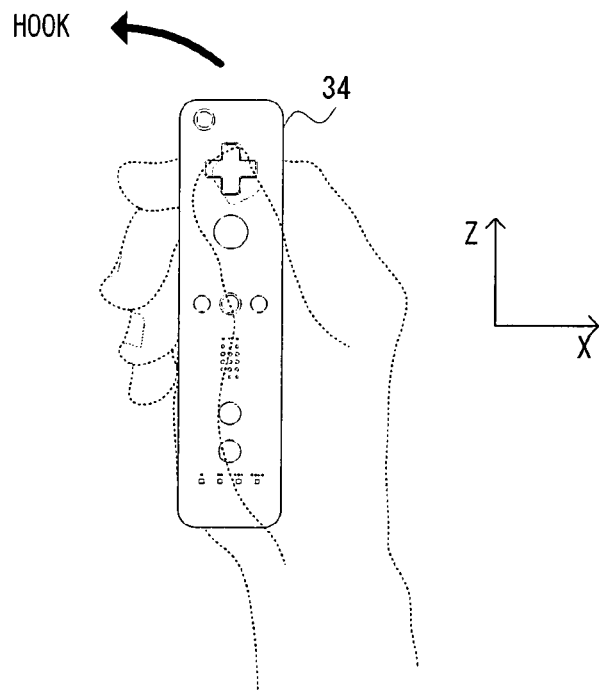
FIG. 7 is an illustrative view showing a relationship between a hand of the first controller and accelerations in the direction of axes, FIG. 7 (A) shows a right-handed case, and FIG. 7 (B) shows a left-handed case.
Figure 7:
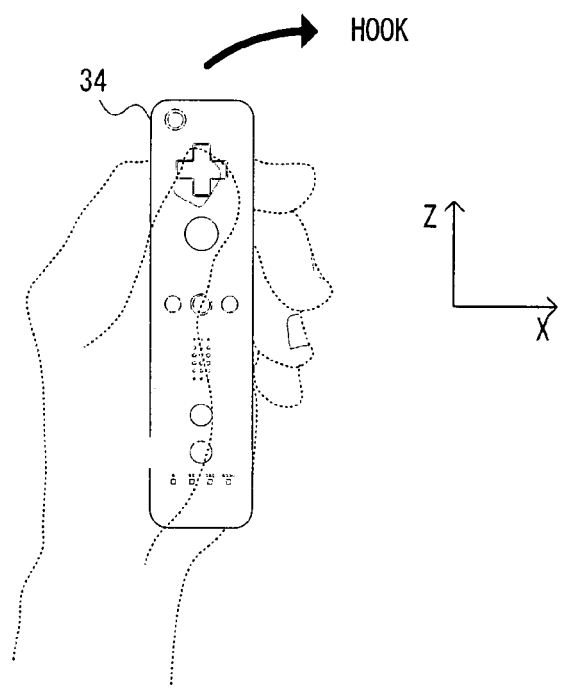

In a memory area 104, a hand setting program is stored. By the program, a setting is performed of hand information indicative of which hand the first controller 34 is held with. As described above, the three-axis directions of the acceleration sensor 84 integrated in the first controller 34 (FIG. 3) and the three-axis directions of the acceleration sensor 90 integrated in the second controller 36 (FIG. 4) are determined in advance, and therefore, depending on with which hand the first controller 34 and the second controller 36 are held, the direction of the acceleration detected when the player throws a hook is reversed. FIG. 7 is an illustrative view showing a relationship between the hand of the first controller 34 and the direction of the axes set to the acceleration sensor 84. In FIG. 7, the first controller 34 viewed from the player's side is shown, and the first controller 34 is vertically (Z-axis direction is a vertical direction) held. A hook punch is thrown from the opposite direction between the right-handed case shown in FIG. 7 (A) and the left-handed case shown in FIG. 7 (B). That is, the direction of the hook motion with respect to the X-axis direction of the acceleration sensor 84 is reversed, and the detected direction of the X acceleration is also reversed. Accordingly, the hand information is obtained in advance in order to correct the direction of the acceleration to be detected depending on the hand of the controller 14. The setting of the hand is performed on an option setting screen before the start of the match, for example, by causing the player to select with which hand the first controller 34 is held, the right hand or the left hand. Or, it may be possible to make the player to select whether a right-hander or a left-hander. The controller 14 is ranked such that the first controller 34 is a main controller, and the second controller 36 is an expansive sub controller. The hand information can be obtained by the dominant hand on the basis of the premise that the first controller 34 is held with the dominant hand.

Returning to FIG. 6, in the memory area 106, an acceleration acquiring program is stored. By the program, acceleration data is periodically (for each frame) obtained from the controller data received from the controller 14. As described above, the controller data includes the acceleration data of the acceleration sensor 84 of the first controller 34 and the acceleration data of the acceleration sensor 90 of the second controller 36. Also, the acceleration sensors 84 and 90 utilized in this embodiment constantly detect gravitational accelerations as described above, and therefore, the acceleration of each axis includes a gravitational acceleration component depending on the orientation (posture) of the first controller 34 or the second controller 36. Accordingly, for example, the accelerations are detected in a state a player squares up without throwing a punch before start of a match, and from the detected acceleration data, each axial gravitational acceleration component is obtained and stored in advance. Then, by subtracting each gravitational acceleration component from acceleration of each axis detected after the start of the match, acceleration caused by the motion of the player can be obtained. It should be noted that as described above, in the controller 14, the acceleration is detected at a sampling period shorter than one frame of the game apparatus 12, and in the game apparatus 12, a plurality of accelerations can be obtained per frame, and therefore, by taking an average value, a maximum value, a minimum value, or the like, it may be possible to obtain acceleration representative of the frame.

In a memory area 108, a punch start determining program is stored. By the program, whether a first condition for determining whether or not the player starts an acceleration input (punch motion) is satisfied or not is determined on the basis of the acceleration obtained by the acceleration acquiring program. When an input is started by the player by means of the controller 14, an acceleration value equal to or more than a constant is detected. Accordingly, as a first condition, the magnitude of the composite vector (vector having respective axial accelerations as a component) in each axial acceleration is equal to or more than a predetermined threshold value is adopted. By the first condition, it is possible to appropriately determine the start of the input of the acceleration. In this embodiment, because the three-axis acceleration sensor is used, the magnitude of the composite vector of the accelerations in the three-axis directions is calculated to thereby determine whether or not the magnitude of the composite vector is equal to or more than a predetermined threshold value.

In addition, the magnitude of the composite vector of the accelerations of the first controller 34 and the magnitude of the composite vector of the accelerations of the second controller 36 are calculated, and therefore, it is possible to recognize with which controller 14 a punch motion is performed. On the basis of the information of the moved controller 14 and the hand information, it is possible to recognize with which hand a punch motion is performed. Accordingly, a motion with the hand the same as that actually moved by the player can be executed in the game space, for example. In this embodiment, the movement of the glove object 204 or the punch motion (see FIG. 16, etc.) of the player character 200 is controlled, and therefore, a glove object 204 corresponding to the hand with which the player throws a punch is selected, and the identification information of the selected glove object 204 can be stored as a glove object to be moved.

In a memory area 110, an elapsed time determining program is stored. By the program, it is determined whether or not an elapsed time from the start of the punch is smaller than a predetermined threshold value. In this embodiment, when a punch motion by the player is started, although the kind of the punch motion has not yet been determined, the motion corresponding to the straight is started. Then, the kind of the punch motion by the player is determined on the basis of the acceleration detected thereafter. When the kind is determined to be a hook, the motion corresponding to a straight is changed to the motion corresponding to a hook. Thus, the change in motion to a hook after progress of the straight motion to a certain extent makes the punch motion on the game screen look unnatural, and makes the player feel an uncomfortable feeling. Accordingly, by the elapsed time determination, the determination of the kind of the motion is stopped to prevent the change in motion to a hook from being performed after the predetermined time has elapsed from the start of the punch motion by the player. It should be noted that in a case that the kind of the punch motion by the player can be early determined (time to the extent that the change of the motion does not look unnatural), or in a case that the emphasis is placed on the accuracy of the kind of the punch motion rather than some unnaturalness, the elapsed time determination need not to be performed.

In a memory area 112, an axis correction program is stored. By the program, the direction of the axis of acceleration is adjusted, and the obtained acceleration value is corrected. The determination of the kind of the punch motion is performed on the basis of the corrected acceleration. By the correction of the axis, the same determination processing can be applied regardless of the hand and the kind of the controller 14, allowing an efficient determination of the punch motion by the player.

As described above, depending on the hand of the first controller 34 and the second controller 36, the direction of the X-axis acceleration in throwing a hook is reversed (FIG. 7). Here, the sign of the X-axis acceleration is reversed depending on the hand by the axial correction. In this embodiment, as shown in FIG. 7 (A), an X-axis direction in a case that the first controller 34 is held with the right hand is adopted as a reference. Accordingly, in a case that the hand of the first controller 34 is the right hand, the correction of the axis of the second controller 36 is required. In the correction of the axis, an X-axis vector of the acceleration of the second controller 36 is reversed, that is, the sign of the X-axis acceleration of the second controller 36 is reversed. On the other hand, as shown in FIG. 7 (B), in a case that the first controller 34 is held with the left hand, the correction of the axis of the first controller 34 is required, and the sign of the X-axis acceleration of the first controller 34 is reversed. It should be noted that in this case, since the second controller 36 is held with the right hand, the X-axis direction of the acceleration sensor 90 is the same as the X-axis direction of the acceleration sensor 84 when the first controller 34 is held with the right hand as the reference, and therefore, the correction of the X-axis direction is not needed.

Also, as described above, when the second controller 36 is viewed from a side, the housing 86 has a curved shape in the YZ plane. As understood from the drawing at the upper left shown in FIG. 8, when the end portion furnished with the analog joystick 88a of the second controller 36 is made horizontal, the axis of the acceleration sensor 90 is set such that the Z-axis direction of the acceleration sensor 90 is made horizontal and the Y-axis direction thereof is made vertical. When the second controller 36 is vertically held, the back end of the curved shape of the housing 86 is held in the palm, and the Y-axis direction and the Z-axis direction of the acceleration sensor 90 are respectively inclined from the vertical direction and the horizontal direction as shown in the drawing of the upper right in FIG. 8. The Y-axis direction and Z-axis direction when the second controller 36 is vertically held are different from the Y-axis direction and the Z-axis direction when the first controller 34 is vertically held (see FIG. 11). Accordingly, in the correction of the axis, the accelerations of the Y-axis and the Z-axis of the second controller 36 are corrected. More specifically, as described above, by the gravitational acceleration detected before the punch motion, the orientation of the second controller 36 when being held is grasped. Accordingly, a transformation coefficient is calculated in order to respectively decomposing the Y-axis acceleration and the Z-axis acceleration into the horizontal direction component (Y-axis direction at the lower part in FIG. 8) and the vertical direction component (Z-axis direction at the lower part in FIG. 8). Then, corrected Y-axis acceleration and Z-axis acceleration are obtained on the basis of the detected Y-axis acceleration and Z-axis acceleration and the transformation coefficient.

Figure 9:
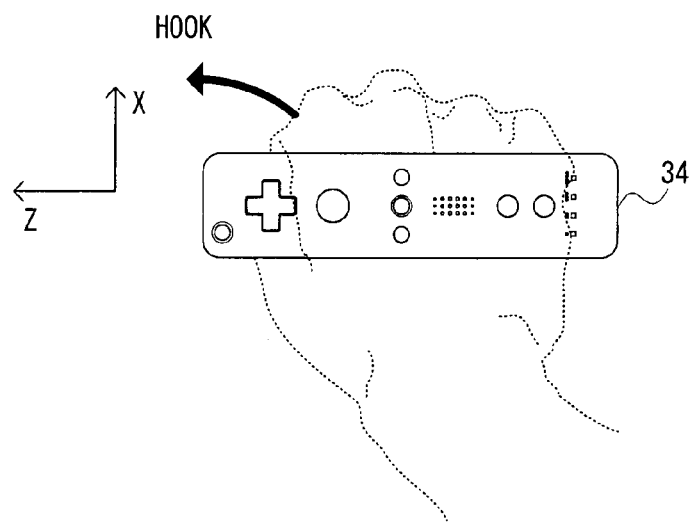
FIG. 9 is an illustrative view showing a first controller horizontally held by a player, FIG. 9 (A) show the first controller viewed from the player's side, and FIG. 9 (B) is the first controller viewed from above.
Figure 9:
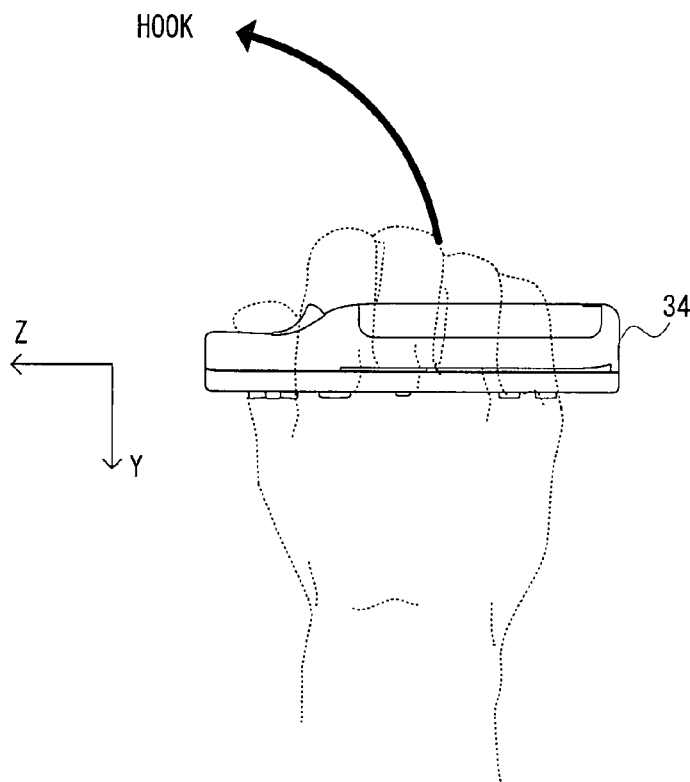

In a memory area 114, a YZ determination program is stored. By the program, it is determined whether or not a punch motion is a hook on the basis of the Y-axis acceleration and the Z-axis acceleration. More specifically, by the YZ determination, it is possible to determine whether or not a hook is thrown with the controller 14 horizontally held. FIG. 9 shows the first controller 34 horizontally held with the player's right hand. It should be noted that as understood from FIG. 7, with respect to the first controller 34, the cross key 80*a* and the A button 80*d* are arranged in such a position that the thumb is reachable, and the B button 80*h* is arranged in such a position that the forefinger is reachable when the controller is held. Thus, when the player horizontally holds the first controller 34 with the right hand for a punch motion, as shown in FIG. 9, the front end of the housing 78 becomes the left direction of the player, and the surface furnished with the cross key 80*a* is faced to the side of the player. Therefore, as can be understood from FIG. 9 (B), in the setting of the axes of the acceleration sensor 84 in this embodiment, a hook punch is thrown to a Z-axis positive direction and a Y-axis negative direction in the YZ plane.

When a hook is thrown from the state in FIG. 9, acceleration to a certain extent occurs in the Z-axis positive direction. Accordingly, in the YZ determination, it is first determined whether or not the Z-axis acceleration is equal to or more than a predetermined threshold value.

Figure 10:
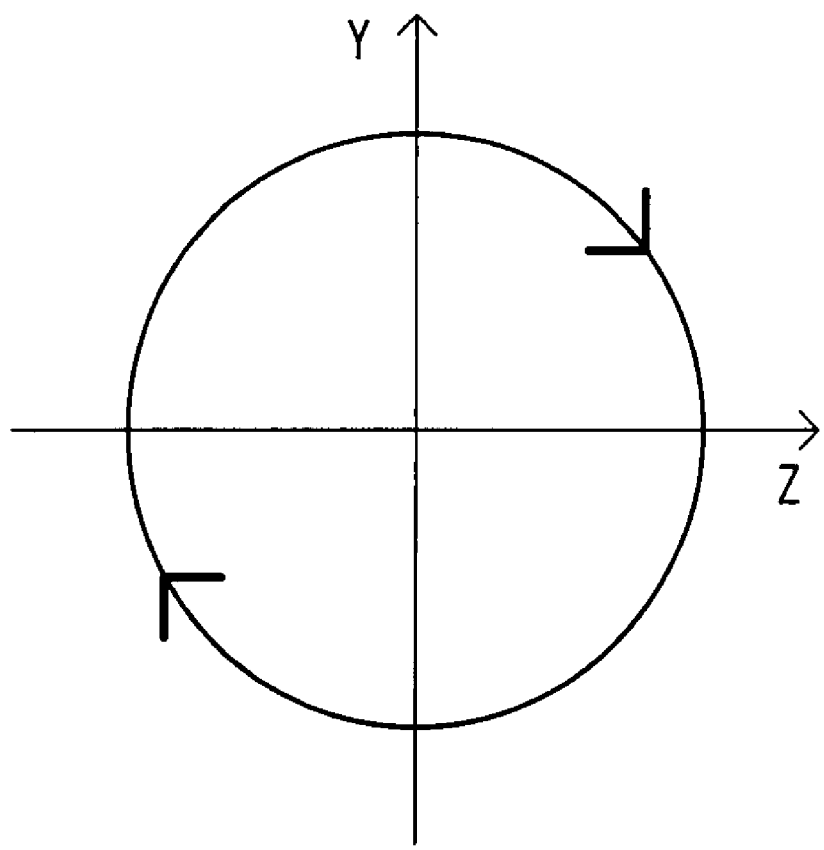
FIG. 10 is an illustrative view diagrammatically showing changes in a YZ plane of Y-axis acceleration and Z-axis acceleration in a case that a hook is thrown with the first controller horizontally held as shown in FIG. 9.

In addition, the hook motion in a state that the controller is horizontally held is a motion in the YZ plane, and the movement of the Y-axis acceleration and the Z-axis acceleration are characterized as follows. That is, as to the Z-axis acceleration, at a start of throwing a punch, acceleration occurs in the positive direction, is reversed to the negative direction with reducing speed, and finally becomes 0. Also, as to the Y-axis acceleration, at a start of punching, centrifugal force occurs in the negative direction, is reversed to the positive direction with gradually reducing the centrifugal force, and finally becomes 0. When the points to indicate Y-axis acceleration and Z-axis acceleration thus changed are plotted in the YZ coordinate system having the Y-axis acceleration and the Z-axis acceleration as components, the points indicative of the acceleration have characteristics of shifting to the right (clockwise) as shown in FIG. 10. It should be noted that in FIG. 10, in order to clearly show the shift to the right, the change of the accelerations are schematically shown. Accordingly, the fact that the points indicative of the Y-axis acceleration and the Z-axis acceleration are shifted to the right can be adopted as a condition for determining the hook. Accordingly, in the YZ determination, whether or not the changes of the Y-axis acceleration and the Z-axis acceleration indicate a shift to the right is determined, in addition to the determination of the above-described Z-axis acceleration with reference to the threshold value.

Additionally, in FIG. 9, the YZ determination condition is described by showing a case that the first controller 34 is horizontally held with the right hand. However, a hook motion in a case that the first controller 34 is horizontally held with the left hand has a relationship between the direction of the hook operation and the directions of the Y-axis and the Z-axis the same as that in a case that the controller 34 is held with the right hand as shown in FIG. 9, and therefore, the same determination condition can be used. Furthermore, similarly, the same determination condition can be employed to a hook motion in a case that the second controller 36 is horizontally held.

Additionally, in a case that the setting of the axes of the acceleration sensor 84 is changed in another embodiment, conditions, such as the sign of the threshold value, a relationship with the threshold value for determining the Z-axis acceleration, and a shifting direction of the points having the Y-axis acceleration and the Z-axis acceleration as components may be changed according to the setting of the axes.

Figure 11:
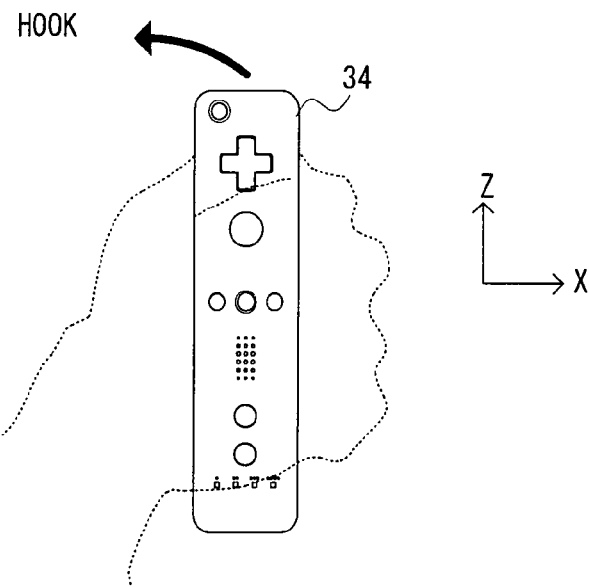
FIG. 11 is an illustrative view showing the first controller vertically held by the player, FIG. 11 (A) is the first controller viewed from the player's side, and FIG. 11 (B) shows the first controller viewed from above.
Figure 11:
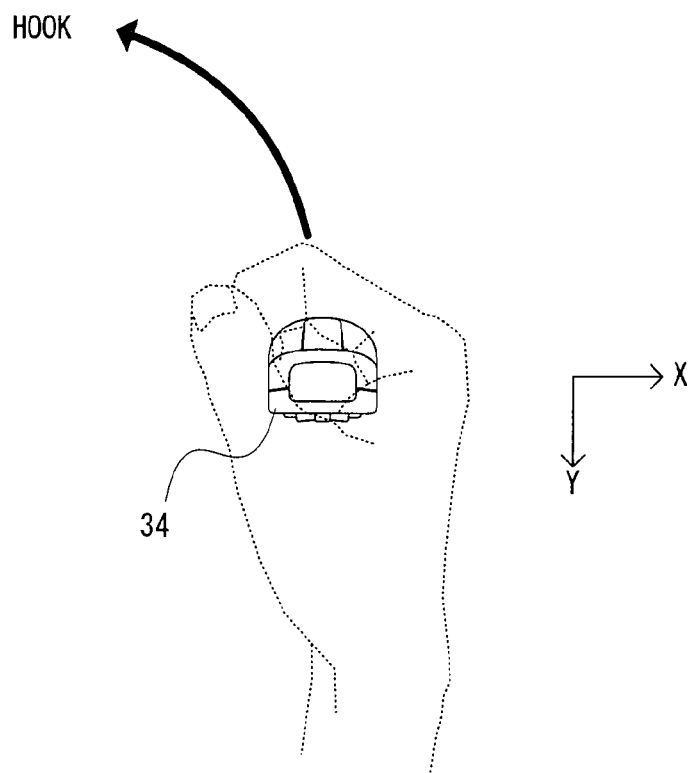

Returning to FIG. 6, in a memory area 116, an XY determination program is stored. By the program, it is determined whether or not a punch motion is a hook on the basis of the X-axis acceleration and the Y-axis acceleration. More specifically, in the XY determination, it is possible to determine whether or not a hook is thrown with the controller 14 vertically held. FIG. 11 shows the first controller 34 vertically held with the player's right hand. When the player vertically holds the first controller 34 with the right hand for the punch motion, from the positional relationship between the cross key 80*a*, the A button 80*d*, the B button 80*h*, etc. and the fingers used for operation as described above, the front end of the housing 78 is upward, and the surface furnished with the cross key 80*a* is faced to the player as shown in FIG. 11. Therefore, in the setting of the axes of the acceleration sensor 84 of this embodiment, a hook punch is thrown to a Z-axis negative direction and a Y-axis negative direction in the XY plane as understood from FIG. 11(B).

Figure 12:
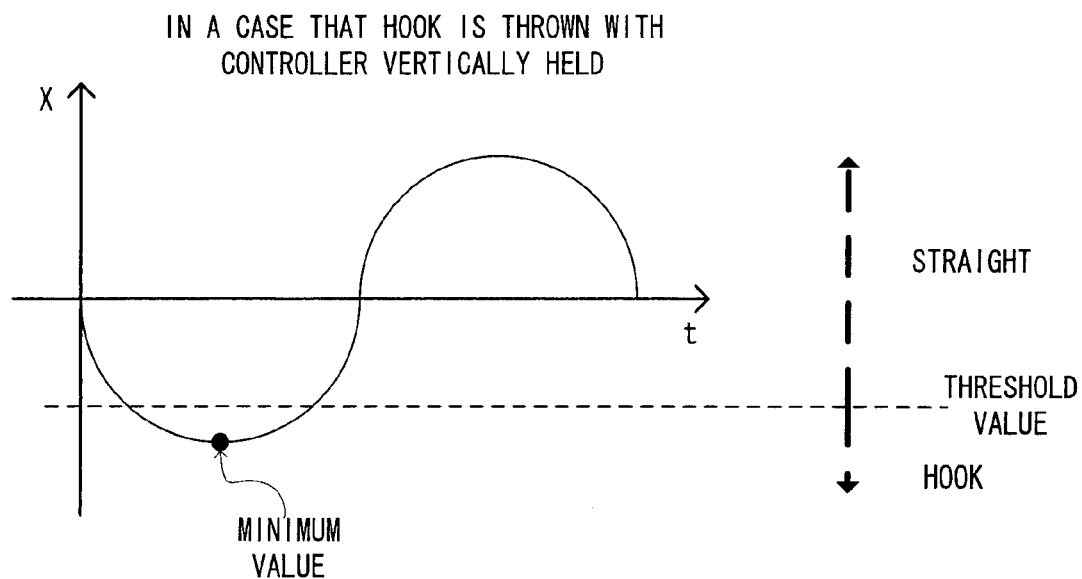
FIG. 12 is an illustrative view diagrammatically showing the time variation of X-axis acceleration in a case that a hook is thrown with the first controller vertically held shown in FIG. 11.

When a hook is thrown from the state in FIG. 1, acceleration in a negative direction first occurs with respect to the X-axis acceleration. More specifically, FIG. 12 schematically shows a time variation of the X-axis acceleration. The X-axis acceleration takes on a minimum value at a relatively early stage of the hook motion.

On the other hand, in a case that a straight is thrown from the state in FIG. 11, the controller 34 moves in the only one direction of the Y-axis, that is, a straight is a linear acceleration input to the Y-axis direction, and therefore, little X-axis acceleration occurs. Accordingly, by focusing attention on the X-axis acceleration, it is possible to determine whether the punch is a hook or a straight basically depending on whether or not the X-axis acceleration takes on a negative value having magnitude to a certain extent, that is, whether or not the X-axis acceleration is equal to or less than a predetermined threshold value.

Figure 13:
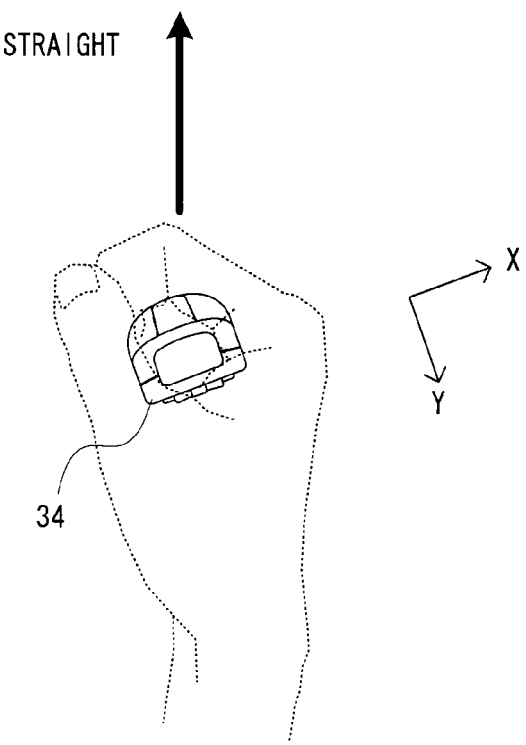
FIG. 13 is an illustrative view showing the first controller vertically held in a state that it is rotated about a Z-axis within the player's hand.

However, when the first controller 34 is held, the first controller 34 may be rotated about the Z-axis direction in the hand as shown in FIG. 13. When a straight is thrown in a state that the first controller 34 is held in such a manner as to be rotated about the Z-axis, accelerations of the two-axis directions like the X-axis direction and the Y-axis direction are detected similar to a case that a hook is thrown. Furthermore, the X-axis acceleration may take on a value equal to or less than the threshold value as a determination condition shown in FIG. 12. Thus, in a case that the X-axis acceleration takes on a value equal to or less than the threshold value shown in FIG. 12 is the only condition, less accuracy of the determination occurs.

Here, in this embodiment, by making determination based on the characteristics of changes in the X-axis acceleration and the Y-axis acceleration, a straight thrown in such a manner as to being rotated about Z-axis is excluded.

Figure 14:
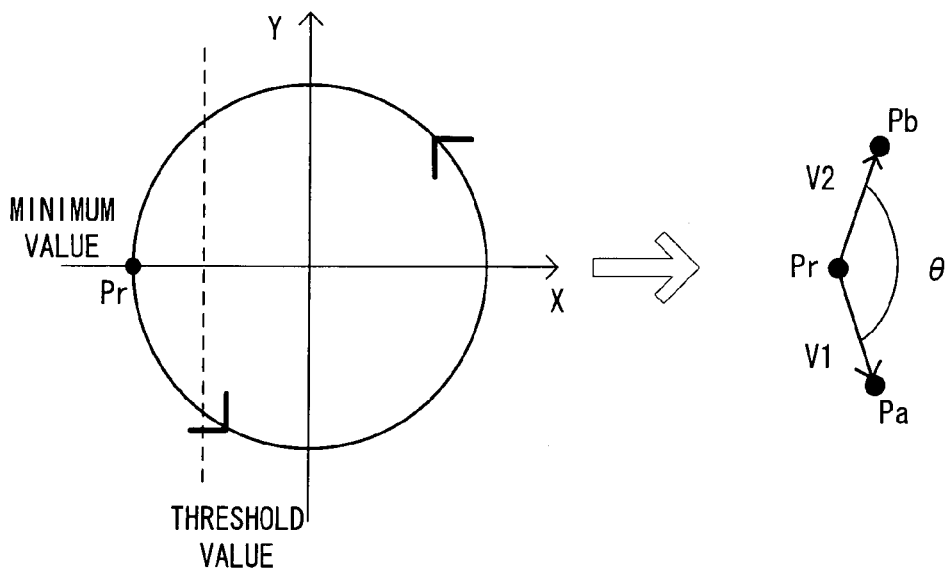
FIG. 14 is an illustrative view diagrammatically showing changes of X-axis acceleration and Y-axis acceleration in an XY plane in a case that a punch is thrown with the first controller vertically held and calculation of an angle between acceleration change vectors, FIG. 14 (A) shows a case that a hook is thrown, and FIG. 14 (B) shows a straight is thrown with the controller rotated about the Z-axis in FIG. 13.
Figure 14:
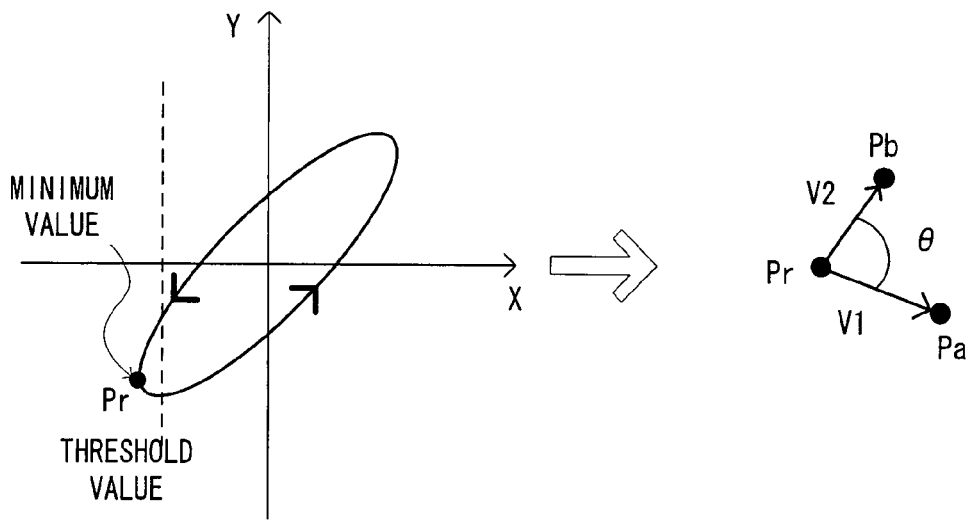

FIG. 14 schematically shows the characteristics of the changes of the X-axis acceleration and the Y-axis acceleration in a case that the first controller 34 is vertically held to throw a punch. That is, the points indicative of the X-axis acceleration and the Y-axis acceleration are plotted in the XY coordinate system having the X-axis acceleration and the Y-axis acceleration as components. FIG. 14 (A) shows a case that a hook is thrown, and FIG. 14 (B) shows a case that a straight is thrown in a state that the first controller 34 is rotated about the Z-axis. As understood from FIG. 14, in both cases, the X-axis acceleration is equal to or less than the threshold value for discriminating a hook from a straight shown in FIG. 12, but as described above, by merely determining the relationship with the threshold value, it is impossible to accurately identify the kind of the punch.

However, it has been found that the hook and the straight can accurately and smoothly be identified on the basis of the changes of the X-axis acceleration and the Y-axis accelerations before and after the timing when the minimum value of the X-axis acceleration is detected. More specifically, for the hook, a locus of the point having the X-axis acceleration and the Y-axis acceleration as components shows nearly a circle as understood from FIG. 14 (A) while for the straight, the locus is a slim narrowed and inclined nearly oval as understood from FIG. 14 (B). The hook is a movement in a curved or bending manner in the XY plane, and is an acceleration input in a curved and bending manner, and therefore, centrifugal force occurs. On the other hand, the straight is a linear movement in the XY plane and is a linear acceleration input, and thus centrifugal force does not occur. It is thought that depending on the presence or absence of the centrifugal force, the locus becomes different in shape, thus capable of distinguish one from another.

Especially, when an attention is paid to the timing before and after the minimum value of the X-axis acceleration is detected, for a hook, the locus is smoothly reversed while for a straight, the locus is relatively sharply reversed. In more detail, depending on whether a hook or a straight, a difference occurs to the angle θ between the acceleration change vectors V1 and V2 at the timing before and after the minimum value is detected, and the angle for a hook is larger than that for a straight. Accordingly, by determining whether or not the angle θ between the acceleration change vectors V1 and V2 is equal to or more than a predetermined threshold value, it is possible to distinguish between the hook and the straight.

As shown in FIG. 12, the minimum value of the X-axis acceleration is detected at a relatively early stage of the punch motion, and therefore, by utilizing the acceleration at the timing before and after the minimum value, it is possible to discriminate the hook from the straight in a brief time.

As a detailed process for XY determination, whether or not the obtained X-axis acceleration is a minimum value is first determined to detect the timing (frame) at the minimum value. Here, the X-axis acceleration and the Y-axis acceleration when the X-axis acceleration takes on a minimum value become a reference when the acceleration change vectors V1 and V2 are calculated, and therefore, the timing at which the X-axis acceleration takes on the minimum value is called a reference timing, for the sake of convenience. The X-axis acceleration changes as shown in FIG. 12, and therefore, the determination for the minimum value can be performed by determining whether or not the current value is larger than the previous value every time that the X-axis acceleration is obtained, that is, for each frame. When it is determined that the obtained X-axis acceleration is above the previous value at the first time, the X-axis acceleration at the previous frame is the minimum value, and the previous frame is the reference timing.

When the minimum value of the X-axis acceleration is detected, it is determined whether or not the minimum value is equal to or less than the threshold value shown in FIG. 12. As described above, in a case that a straight is thrown in such a manner that the first controller 34 is not rotated about the Z-axis, the minimum value of the X-axis acceleration is never below the threshold value, and therefore, according to the determination, it is possible to exclude the case of the straight.

In a case that the minimum value of the X-axis acceleration is equal to or less than the threshold value, the acceleration change vectors V1 and V2 before and after the reference timing are calculated. More specifically, an acceleration change vector V1 is calculated on the basis of the acceleration of the reference timing and the next timing (frame). The V1 may also be referred to as a first vector. As shown in FIG. 14 (A), the first vector V1 is a vector from a point Pr having the X-axis acceleration and Y-axis acceleration of the reference timing (previous frame) as components to a point Pa having the X-axis acceleration and the Y-axis acceleration at the next timing (current frame) as components. Furthermore, on the basis of the accelerations at the reference timing and the previous timing, an acceleration change vector V2 is calculated. The V2 may also be referred to as a second vector. As shown in FIG. 14 (B), the second vector V2 is a vector from a point Pr having the X-axis acceleration and the Y-axis acceleration of the reference timing (previous frame) as components to a point Pb having the X-axis acceleration and the Y-axis acceleration at the previous timing (one before last frame) as components.

Then, the angle θ formed by the first vector V1 and the second vector V2 is calculated to determine whether or not the angle θ is equal to or more than a predetermined threshold value (angle). In a case that the angle θ is equal to or more than the threshold value, the punch motion by the player is determined to be a hook.

Thus, on the basis of the angle θ between the acceleration change vectors V1 and V2 before and after the reference timing, it is possible to determine whether the kind of the acceleration input is a linear acceleration input in any one (Y in this embodiment) of the two-axis directions (X and Y in this embodiment) or an acceleration input in the direction including the two-axis directions as components. Accordingly, it is possible to accurately identify the kind of the acceleration input irrespective of how to hold the first controller 34.

Furthermore, in FIG. 11 and FIG. 13, the XY determination condition is explained by showing a case that the first controller 34 is vertically held with the right hand. However, as to a hook operation when the first controller 34 is vertically held with the left hand, the X-axis direction is inverted depending on the above-described axis correction program, and therefore, the same determination condition can be utilized. Furthermore, as to the hook operation in a case that the second controller 36 is vertically held with the left hand, the X-axis direction is inverted depending on the above-described axis correction program, and the Y-axis direction and the Z-axis direction are corrected, and therefore, the same determination condition can be utilized. Furthermore, as to a hook operation when the second controller 36 is vertically held with the right hand, the Y-axis direction and the Z-axis direction are corrected by the above-described axis correction program, and therefore, the same determination condition can be utilized.

Furthermore, in a case that the setting of the axes of the acceleration sensor 84 is changed in another embodiment, the conditions like the sign of the threshold value for determination of the X-axis acceleration and the magnitude relation with respect to the threshold value, etc. may be changed appropriately depending on the setting of the axes. For example, in a case that the sign of the X-axis direction is set so as to be reversed to that in FIG. 3, the sign of the threshold value shown in FIG. 12 and FIG. 14 is positive, and the maximum value of the X-axis acceleration is detected to determine whether or not the maximum value is equal to or more than the threshold value. Furthermore, the timing at which the X-axis acceleration is above the threshold value to take on the maximum value is detected as reference timing.

It should be noted that YZ determination and the XY determination correspond to the determination of the second condition that is determined on the basis of the acceleration after it is determined that the above-described first condition (condition for determining the start of an acceleration input) is satisfied. The second condition is a condition different from the first condition. As to the YZ determination, the second condition includes the conditions set on the basis of the above-described characteristics of the Y-axis acceleration and Z-axis acceleration (the Z-axis acceleration is equal to or more than the predetermined threshold value, the points indicative of the Y-axis acceleration and the Z-axis acceleration are shifted to the right, and so on). As to the XY determination, the second condition includes the conditions set on the basis of the above-described characteristics of the X-axis acceleration and the Y-axis acceleration (the minimum value of the X-axis acceleration is equal to or less than the threshold value, the angle between the acceleration change vectors before and after the reference timing is equal to or more than the threshold value, and so on).

Returning to FIG. 6, in a memory area 118, a drawing program is stored. By the program, game processing corresponding to the kind of the acceleration input by the player is executed to draw a game image and display it on the monitor 30. In the game processing, an image in which an object makes a motion corresponding to the kind of the acceleration input is drawn.

Figure 15:
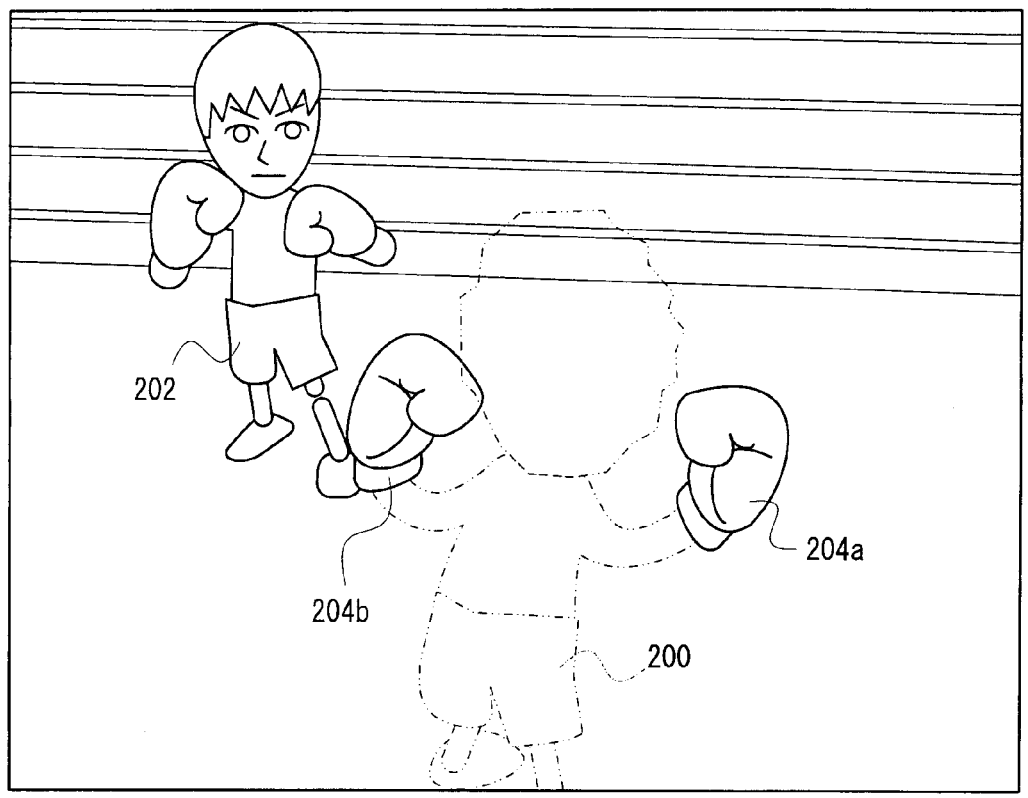
FIG. 15 is an illustrative view showing one example of a game screen before an acceleration input by a player is started.

More specifically, at a start of playing the match, a game image including a player character 200 and an enemy character 202 on a ring in the virtual game space is drawn and displayed on the monitor 30 as shown in FIG. 15. Additionally, in this embodiment, in a case that the player character 200 and the enemy character 202 are overlapped with each other, the body of the player character 200 is translucently drawn (displayed by a chain double-dashed line in the drawing) such that a player can view the enemy character 202. However, the right glove object 204a and the left glove object 204b of the player character 200 is opaquely drawn (displayed by a solid line in the drawing) so as to allow the player to easily view the movement and hit of the punch by the player character 200. Additionally, the left and right glove objects 204a and 204b may generally be represented as a glove object 204.

Figure 16:
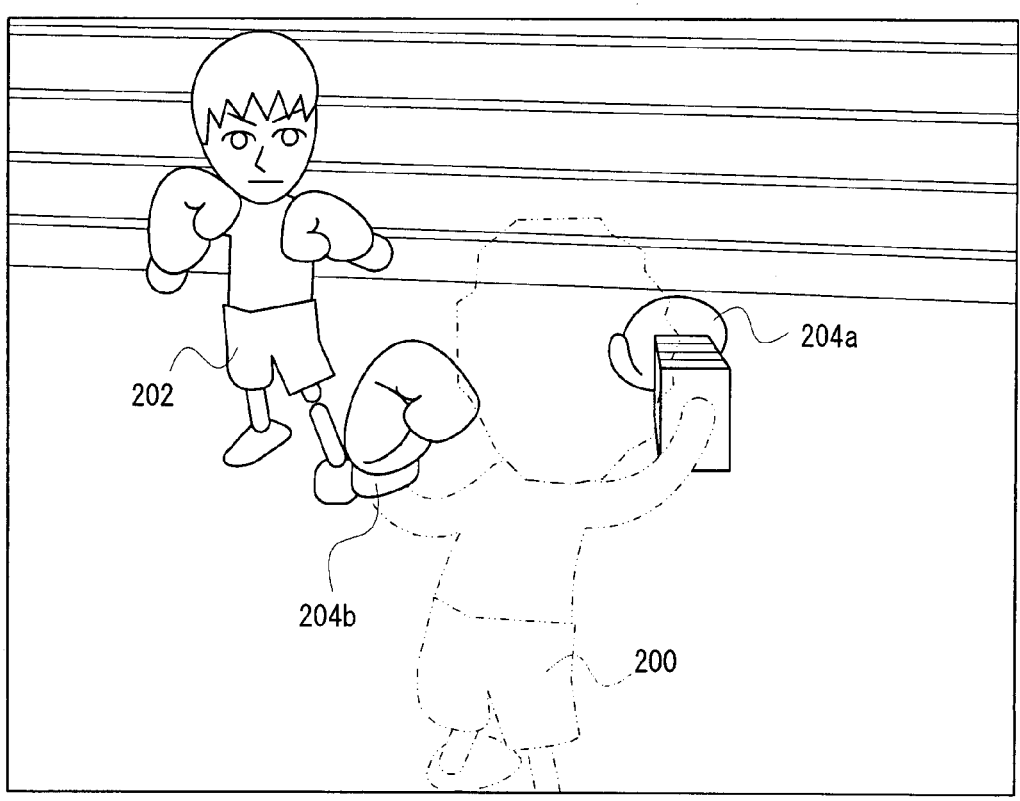
FIG. 16 is an illustrative view showing one example of a game screen in a case that an acceleration input is started by the player's right hand, and showing a scene in which a glove object starts to move along a straight path.

When it is determined that an acceleration input is started by the punch start determining program, although the kind of the input has not yet determined, execution of the first drawing processing as first game processing corresponding to a straight as a first kind of the input is started. That is, assuming that the acceleration input is a straight, the game processing corresponding to the straight is started. In other words, drawing of the object moving in accordance with the first motion pattern (movement on the straight path in this embodiment) set in advance is started. Thus, an image in which the object performs a motion corresponding to the first kind is displayed. In the first drawing processing in this embodiment, the movement of the glove object 204 is controlled so as to draw a path of the straight punch. More specifically, the positions of the glove object 204 which moves on the path of the straight are calculated, and the glove object 204 is drawn at the positions. As one example, in a case that the input is started with the controller 14 held with the right hand of the player, a game image in which the right glove object 204a linearly moves is drawn as shown in FIG. 16.

Figure 17:
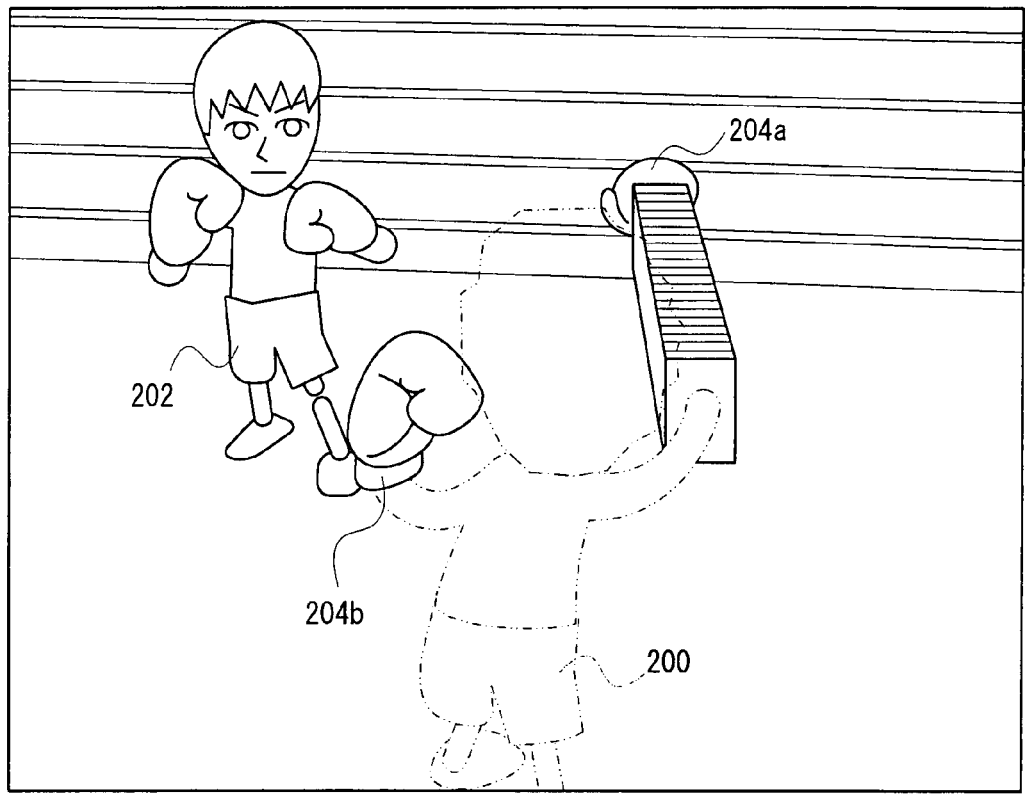
FIG. 17 is an illustrative view showing one example of a game screen in a case that the kind of the acceleration input is not determined to be a hook after FIG. 16, and showing a scene in which the glove object has moved along a straight path.

Then, the first drawing processing corresponding to the straight is continued while the determination of the kind of the acceleration input is performed according to the YZ determination program and the XY determination program. However, the determination of the kind of the acceleration input is performed only when a predetermined time has not yet elapsed from the start of the input. Although it is determined that the predetermined time has elapsed, when the kind of the acceleration input is not determined to be a hook as a second kind, the first drawing processing is executed to the end. Accordingly, as a continued game image in FIG. 16, a game image in which the right glove object 204a moves on the path of the straight to the end as shown in FIG. 17 is rendered. That is, a game image until the player character 200 finishes throwing a right straight is drawn, and displayed on the monitor 30.

Figure 18:
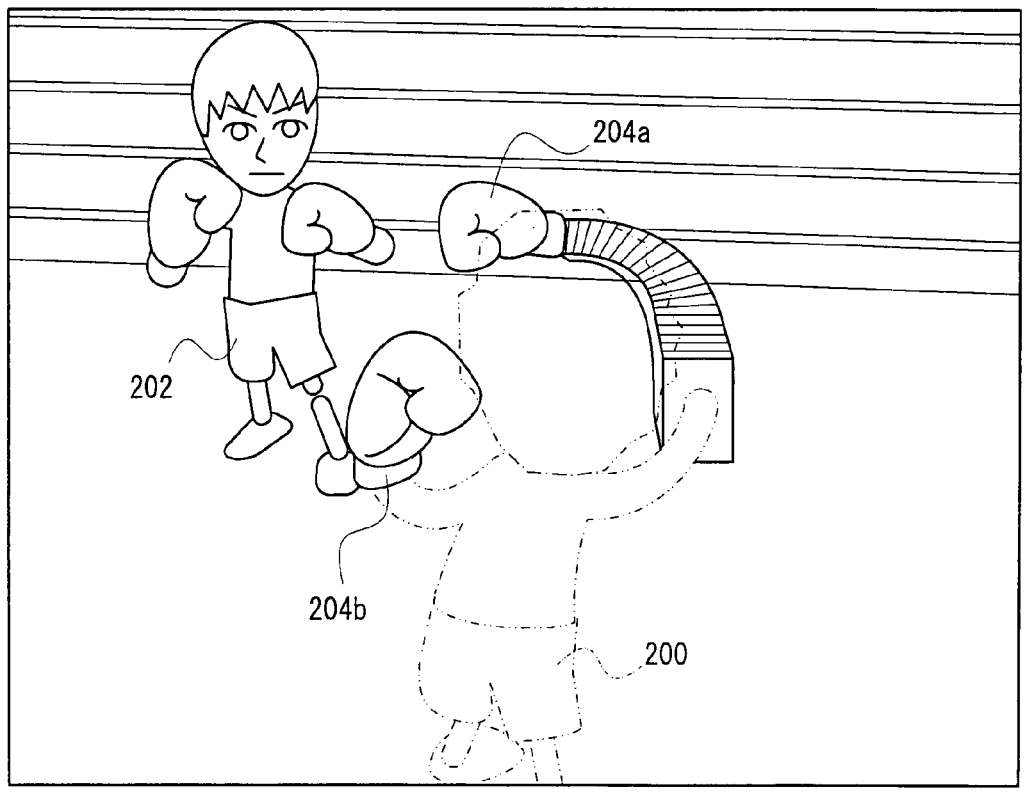
FIG. 18 shows one example of a game screen after the kind of the acceleration input is determined to be a hook after FIG. 16, and shows a scene in which the glove object has moved along a hook path.

On the other hand, when the kind of the acceleration input is determined to be a hook as a second kind, second drawing processing is executed as second game processing corresponding to a hook in place of the first drawing processing. That is, an object moving in accordance with the second motion pattern (movement on the hook path, in this embodiment) different from the first motion pattern is drawn in place of the first motion pattern. This displays an image in which the object makes a motion corresponding to the second kind. More specifically, in the second drawing processing, the movement of the glove object 204 is controlled so as to draw the locus of the hook punch. That is, by regarding the current position as a starting point, the positions of the glove object 204 which moves on the path of the hook are calculated to draw the glove object 204 at the positions. Accordingly, as a continued game image shown in FIG. 16, a game image in which the right glove object 204a moves so as to draw a locus of the hook as shown in FIG. 18 is drawn. That is, a game image until the player character 200 finishes throwing the right hook is drawn and displayed on the monitor 30.

Thus, when it is determined an acceleration input by the player is started, the first game processing corresponding to the first kind out of the game processing corresponding to the kind of the acceleration input is started, and therefore, an image in which the player character 200 throws a punch is drawn at a start of an acceleration input by the player, and the image can be displayed on the monitor 30. Therefore, a high response to the acceleration input can be obtained. Furthermore, when it is determined that the acceleration input is the second kind on the basis of the acceleration to be obtained thereafter, the second game processing corresponding to the second kind is executed in place of the first game processing, and therefore, it is possible to display the image corresponding to the kind of the acceleration input by the player. In addition, the determination of the kind of the acceleration input is performed only during the predetermined time from the start of the input, capable of preventing unnatural changes of motion from occurring.

Returning to FIG. 6, in a memory area 120 of the data memory area 102, image data for generating a game image is stored. The image data includes image data of the player character 200, the glove object 204, the enemy character 202, etc.

In a memory area 122, hand information is stored. The hand information indicates the hand (left hand or right hand) holding the first controller 34 as described above, and is set by the hand setting program so as to be stored in the memory area 122.

In a memory area 124, acceleration information obtained by the above-described acceleration acquiring program is stored. More specifically, the acceleration information includes acceleration values in the X, Y and Z-axis directions of the acceleration sensor 84 of the first controller 34 and acceleration values in the X, Y and Z-axis directions of the acceleration sensor 90 of the second controller 36.

In a memory area 126, acceleration history is stored. Each acceleration information is stored in correspondence with a frame number when being obtained. Furthermore, the acceleration value is a value corrected by the above-described axis correction program as required. When the kind of the acceleration input is determined by the above-described YZ determination program and XY determination program, the acceleration history is referred.

In a memory area 128, a timer for counting an elapsed time from the start of the acceleration input is stored. The timer is reset when it is determined that an acceleration input is started by the above-described punch start determining program, and counted for each frame.

In a memory area 130, a hook flag indicative of the kind of the acceleration input is stored. The hook flag is turned off when an acceleration input is started. Thereafter, when it is determined that the kind of the acceleration input is a hook, the hook flag is turned on.

In a memory area 132, information indicative of the glove object to be moved is stored. By the above-described punch start determining program, with which hand a player makes an input is determined on the basis of the controller 14 which is subjected to an acceleration input and the hand information in the memory area 122, and the information indicative of the glove object 204a or 204b corresponding to the hand is stored. In the above-described drawing program, the movement of the glove object 204 stored in the memory area 132 is controlled, and the game image is displayed.

In a memory area 134, information indicative of the motion pattern is stored. In this embodiment, motion pattern data for moving the glove object 204 on a hook path, motion pattern data for moving the glove object 204 on a straight path, etc. are stored. In the above-described drawing program, the hook motion or the straight motion of the glove object 204 is controlled on the basis of the motion pattern data of a hook or a straight stored in the memory area 134.

Figure 19:
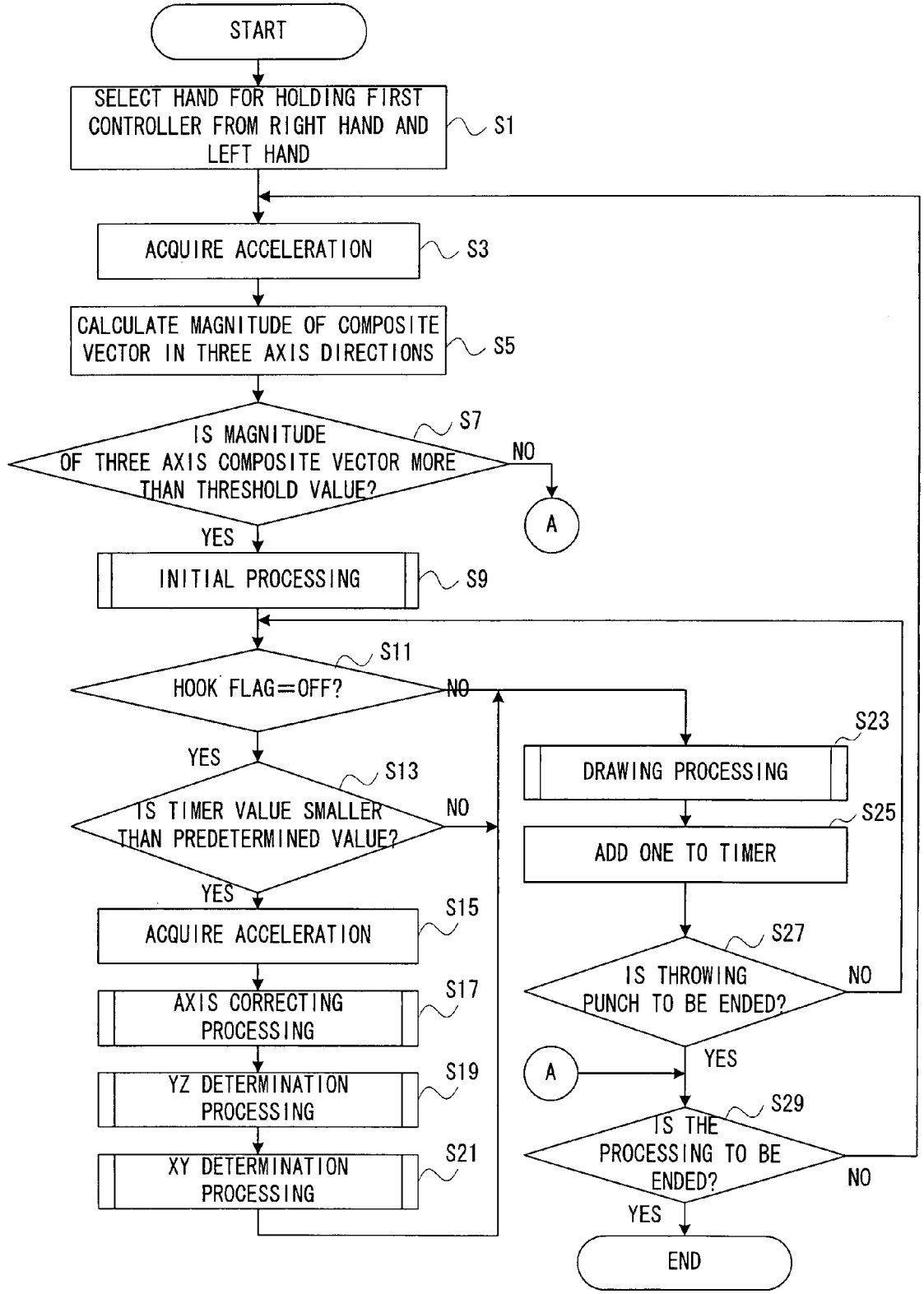
FIG. 19 is a flowchart showing one example of an operation of a CPU of the game apparatus.

FIG. 19 shows one example of an operation of the game apparatus 12. First, in a step S1, the CPU 44 selects with which hand the first controller 34 is held, right hand or left hand. By the above-described hand setting program, an option setting screen is displayed on the monitor 30 to allow a player to set the hand by operating the controller 14. The information indicative of the set hand is stored in the memory area 122.

Next, in a step S3, the CPU 44 acquires acceleration from the received controller data according to the above-described acceleration acquiring program, and stores it in the memory area 124. Succeedingly, in a step S5, the CPU 44 calculates the magnitude of the composite vector having accelerations in the three axis directions. According to the above-described punch start determining program, a three-dimensional vector having accelerations in the X-Y-Z axis directions as a component is calculated as to each of the first controller 34 and the second controller 36. Then, in a step S7, the CPU 44 determines whether or not the magnitude of the three-axis composite vector is equal to or more than a predetermined threshold value. That is, it is determined whether or not an acceleration input is started. Additionally, for which acceleration of the first controller 34 or second controller 36 the composite vector above the threshold value is calculated, and the determination allows identification of the controller 14 with which the acceleration input is started. If "NO" in the step S7, the process proceeds to a step S29.

On the other hand, if "YES" in the step S7, that is, when an acceleration input is started, the CPU 44 executes initial processing in a step S9. The operation of the initial processing is shown in FIG. 20.

Figure 20:
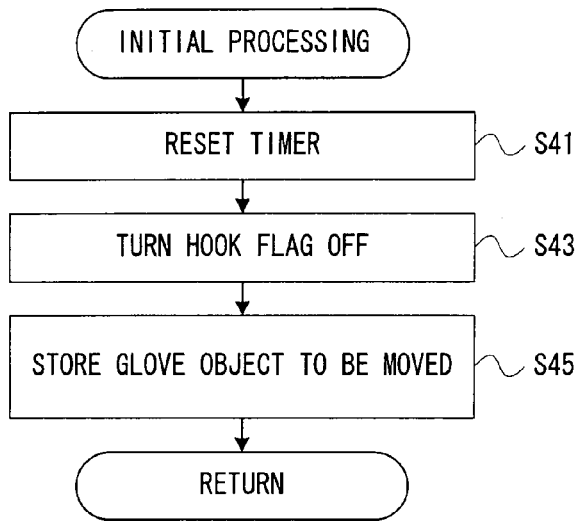
FIG. 20 is a flowchart showing one example of an operation of the initial processing shown in FIG. 19.

When the initial processing in FIG. 20 is started, the CPU 44 resets a timer in a step S41, and stores 0 in the memory area 128. Furthermore, in a step S43, the CPU 44 turns the hook flag off in the memory area 130. Thus, in this embodiment, assuming that the input is a straight at a start of the acceleration input, the drawing processing corresponding to the straight is started. In addition, in a step S45, the CPU 44 specifies the glove object 204 corresponding to the hand with which the acceleration input is performed on the basis of the controller 14 with which the acceleration input is started and the hand information, and stores information indicative of the glove object 204 as the glove object to be moved in the memory area 132. After completion of the initial processing, the processing returns to a step S11 in FIG. 19.

In the step S11 in FIG. 19, the CPU 44 determines whether or not the hook flag is turned off. That is, it is determined whether or not the acceleration input has not yet been determined to be a hook. If "YES" is determined in the step S11, the CPU 44 determines whether or not the timer value of the memory area 128 is smaller than a predetermined value. Here, according to the elapsed time determining program, it is determined whether or not an elapsed time from the start of the acceleration input (elapsed frame count) is less than a predetermined time (predetermined number of frames). That is, it is determined whether or not the execution of the drawing corresponding to a straight can still be changed to the drawing corresponding to a hook.

If "YES" in the step S13, that is, if the elapsed time is a time during which the drawing can be changed from the straight to the hook, in processing from succeeding steps S15 to S21, the kind of the acceleration input is determined. That is, in the step S15, the CPU 44 acquires acceleration information from the received controller data according to the acceleration acquiring program, and stores it in the memory area 124. It should be noted that only the acceleration of the controller 14 with which an acceleration input is performed may be acquired.

Succeedingly, in the step S17, the CPU 44 executes the axis correcting processing according to the axis correction program. The operation of the axis correcting processing is shown in FIG. 21.

Figure 21:
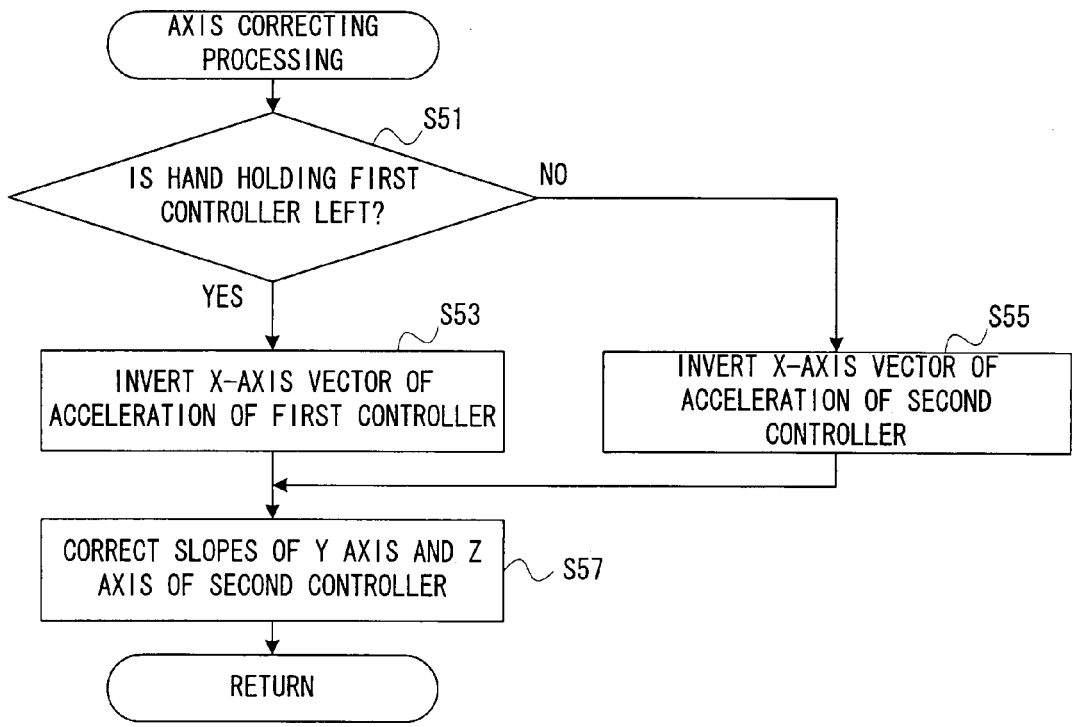
FIG. 21 is a flowchart showing one example of an operation of the axis correcting processing shown in FIG. 19.

When the axis correcting processing is started in FIG. 21, the CPU 44 determines whether or not the hand holding the first controller 34 is the left hand on the basis of the hand information in the memory area 122 in a step S51. If "YES" in the step S51, that is, if the first controller 34 is held with the hand reversed to the reference, the CPU 44 inverts the X-axis vector of the acceleration of the first controller 34 in a step S53. That is, the sign of the X-axis acceleration of the first controller 34 is reversed, and the acceleration is stored in the memory area 124.

Meanwhile, if "NO" in the step S51, that is, if the first controller 34 is held with the hand same as the reference, the CPU 44 inverts the X-axis vector of the acceleration of the second controller 36 in a step S55. That is, the sign of the X-axis acceleration of the second controller 36 is reversed, and the acceleration is stored in the memory area 124.

Figure 8:
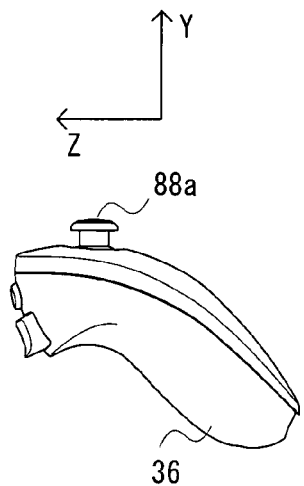
FIG. 8 is an illustrative view showing correction of axes with respect to an output from the acceleration sensor of the second controller.
Figure 8:
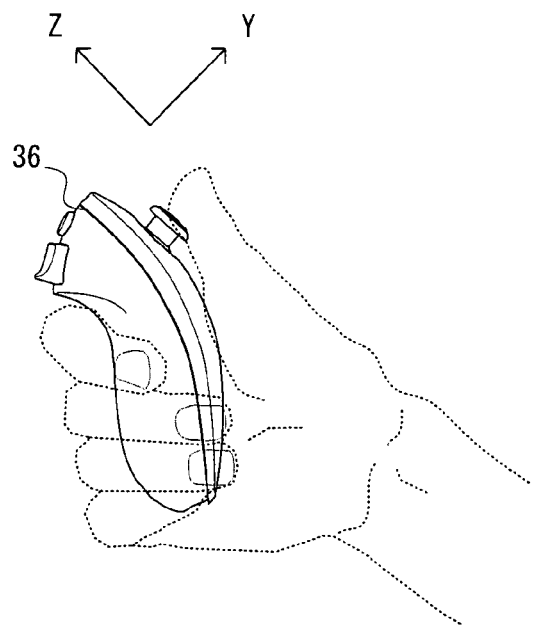
Figure 8:
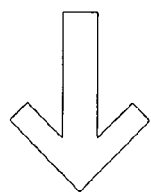
Figure 8:
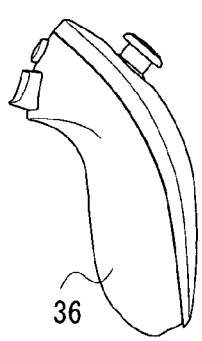
Figure 8:
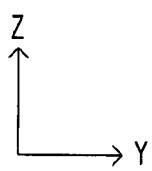

Succeedingly, in a step S57, the CPU 44 corrects the slopes of the Y-axis and the Z-axis of the second controller 36. That is, as shown in FIG. 8, the Y-axis acceleration and the Z-axis acceleration of the second controller 36 are corrected depending on the direction when the second controller 36 is held, and the corrected acceleration is stored in the memory area 124. It should be noted that the direction when the second controller 36 is held is acquired in advance at a time of setting the hand, before starting an acceleration input by the player, or the like. After completion of the axis correcting program, the processing returns to a step S19 in FIG. 19. Additionally, the correction of the axis may be performed on only the acceleration of the controller 14 with which an acceleration input is performed.

Figure 22:
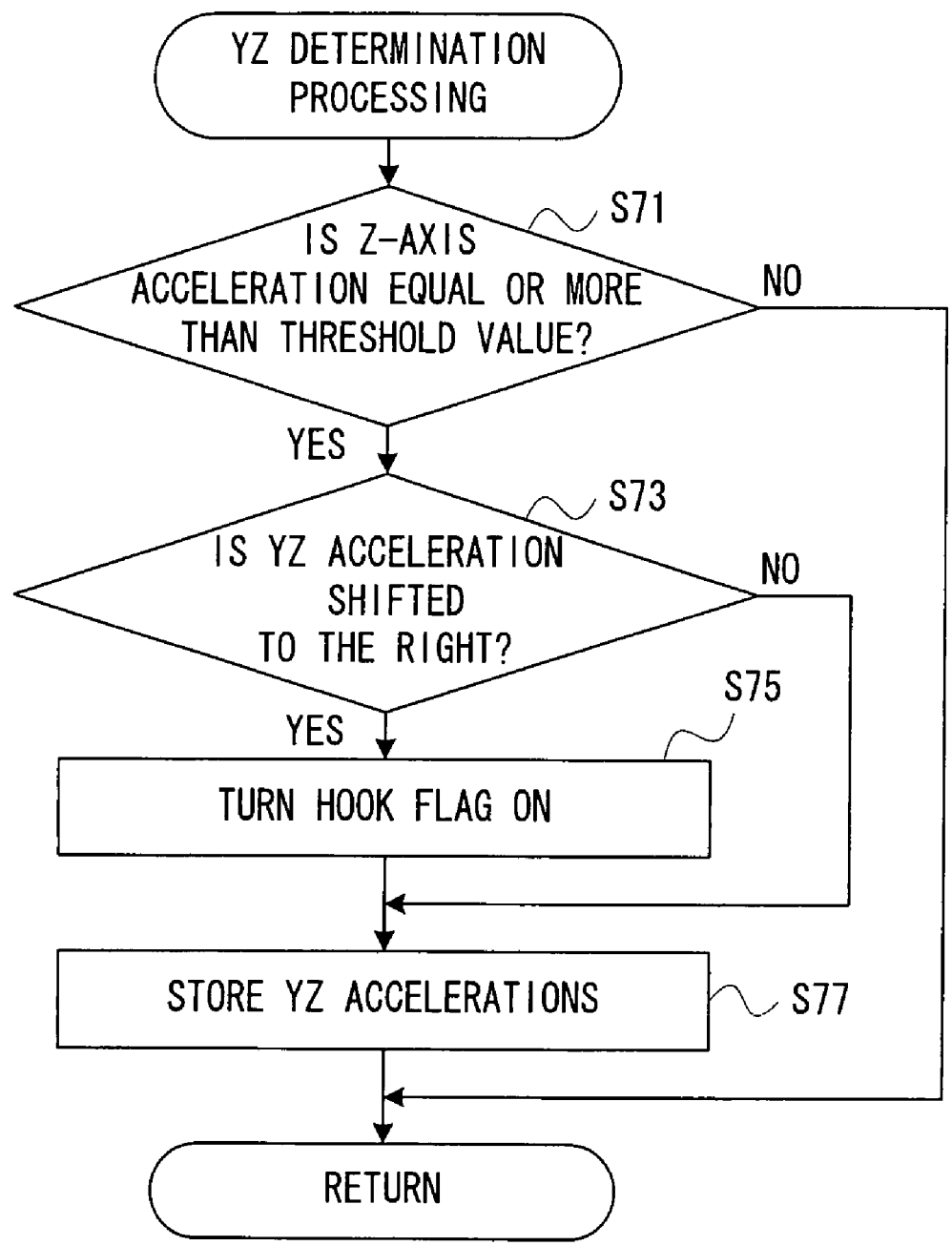
FIG. 22 is a flowchart showing one example of an operation of the YZ determination processing shown in FIG. 19.

In the step S19 in FIG. 19, the CPU 44 executes YZ determination processing according to the YZ determination program. As described above, in the YZ determination, it is determined whether or not a hook is thrown with the controller 14 horizontally held. The operation of the YZ determination processing is shown in FIG. 22. As to the YZ determination, an acceleration value of the controller 14 about which an acceleration input is started is determined in the step S7 is used.

When the YZ determination processing in FIG. 22 is started, the CPU 44 determines whether or not the Z-axis acceleration is equal to or more than a predetermined threshold value in a step S71. As shown in the above-described FIG. 9, when a hook motion is made with the controller 14 horizontally held, acceleration occurs in the Z-axis direction to a certain extent. Accordingly, if "NO" in the step S71, it is possible to determine that the acceleration input is not a hook, and the YZ determination processing is ended as it is.

Meanwhile, if "YES" in the step S71, the CPU 44 determines whether or not the YZ acceleration is shifted to the right as shown in FIG. 10 in a step S73. That is, it is determined whether or not the Y-axis acceleration and the Z-axis acceleration are changed such that a point having the Y-axis acceleration and the Z-axis acceleration as a component is shifted to the right in the YZ plane. If "NO" in the step S73, since the acceleration input cannot be determined to be a hook, the processing proceeds to a step S77. Alternatively, if "YES" in the step S73, it is possible to determine the acceleration input is a hook, and therefore, the CPU 44 turns the hook flag in the memory area 130 on in a step S75.

Succeedingly, in the step S77, the CPU 44 additionally stores the Y-axis acceleration and the Z-axis acceleration for the determination in the step S73 after the next frame and onward in the memory area 126. After completion of the YZ determination processing, the processing returns to a step S21 in FIG. 19.

Figure 23:
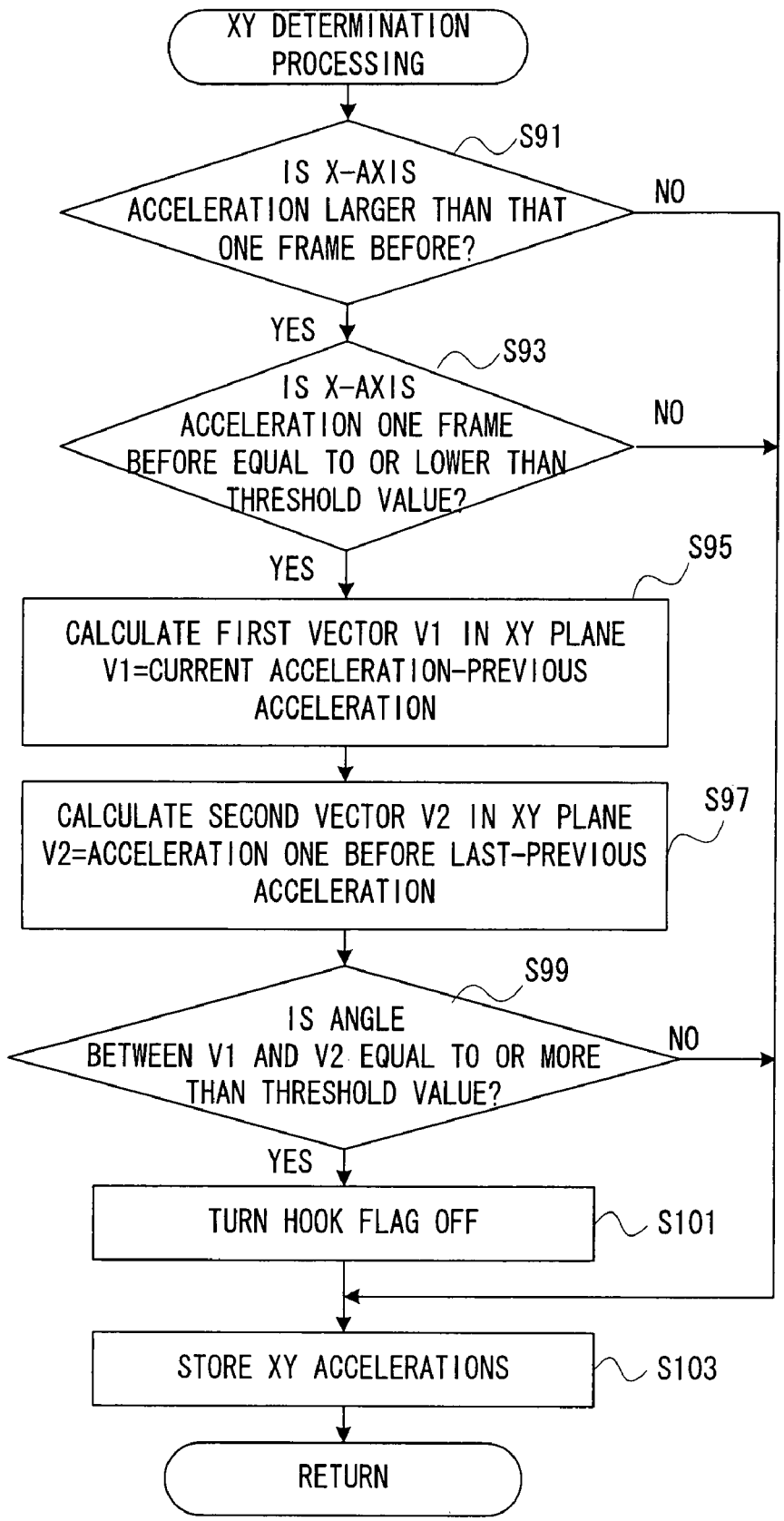
FIG. 23 is a flowchart showing one example of an operation of the XY determination processing shown in FIG. 19.

In the step S21 in FIG. 19, the CPU 44 executes XY determination processing according to the XY determination program. As described above, in the XY determination, it is determined whether or not a hook is thrown with the controller 14 vertically held. The operation of the XY determination processing is shown in FIG. 23. In the XY determination, an acceleration value of the controller 14 about which an acceleration input is started is determined in the step S7 is used.

When starting the XY determination processing in FIG. 23, the CPU 44 determines whether or not the X-axis acceleration is larger than that at one frame before in a step S91. Here, it is determined whether or not the X-axis acceleration of the previous frame is a minimum value. If "NO" in the step S91, it is impossible to determine that the acceleration input is a hook, and therefore, the process proceeds to a step S1103.

On the other hand, if "YES" in the step S91, that is, a frame at which the X-axis acceleration takes on the minimum value can be detected, the CPU 44 determines whether or not the X-axis acceleration before one frame is equal to or less than a predetermined threshold value in a step S93. As shown in FIG. 12, it is determined whether or not the minimum value of the X-axis acceleration is equal to or less than the threshold value.

If "NO" in the step S93, the minimum value of the X-axis acceleration is not below the threshold value, and therefore, it is determined that the acceleration input is not a hook. Then, the process proceeds to the step S103.

On the other hand, if "YES" in the step S93, a frame at which the X-axis acceleration is below the threshold value to take on the minimum value (that is, reference timing) is detected, and therefore, in processing in successive steps S95 to S99, the kind of the acceleration input is determined on the basis of the acceleration change vectors V1 and V2 before and after the reference timing.

In the step S95, the CPU 44 calculates the first vector V1 in the XY plane. More specifically, as shown in FIG. 14, the first vector V1 from a point Pr having the X-axis acceleration and the Y-axis acceleration of the reference timing (previous frame) as components to a point Pa having the X-axis acceleration and the Y-axis acceleration of the next timing (current frame) as components is calculated. The first vector V1 is calculated from the difference between the vector having the current accelerations (X-axis and Y-axis) as components and the vector having the previous accelerations (X-axis and Y-axis) as components.

Furthermore, in the step S97, the CPU 44 calculates the second vector V2 in the XY plane. More specifically, as shown in FIG. 14, the vector V2 from the point Pr having the X-axis acceleration and the Y-axis acceleration at the reference timing (previous frame) as components to a point Pb having the X-axis acceleration and the Y-axis acceleration at the previous timing (frame one before last) as components is calculated. The second vector V2 is calculated from the difference between the vector having the last but one accelerations (X-axis and Y-axis) as components and the vector having the previous accelerations (X-axis and Y-axis) as components.

Then, in the step S99, the CPU 44 calculates an angle θ formed by the first vector V1 and the second vector V2, and determines whether or not the angle θ is equal to or more than the predetermined threshold value. That is, it is determined whether or not the acceleration input is a hook.

If "NO" in the step S99, the angle θ between the acceleration change vectors V1 and V2 is smaller than the predetermined angle, and therefore, the acceleration input is determined not to be a hook. Then, the process proceeds to the step S103.

Additionally, if "NO" in the step S99, and if "NO" in the above-described step S93, the acceleration input is determined to be a straight. Accordingly, in the next frame and the onward, the hook determination may not be performed. For example, by adding a predetermined value to the timer value in the memory area 128, "NO" may be determined in the processing in the step S13 in FIG. 13 from the next frame.

Alternatively, if "YES" in the step S99, it is possible to determine that the acceleration input is a hook, and therefore, the CPU 44 turns the hook flag on in the memory area 130 in a step S101.

Succeedingly, in the step S103, the CPU 44 additionally stores the X-axis acceleration and the Y-axis acceleration in the memory area 126 for determinations in the steps S91 and S93, calculations in the step S95 and S97, etc. at the next frame and the onward. After completion of the XY determination processing, the process returns to the step S23 in FIG. 19.

On the other hand, if "NO" in the step S13 in FIG. 19, that is, if a predetermined time has already elapsed without the kind of the acceleration input being determined to be a hook, the process proceeds to a step S23 so as not to determine the kind of the acceleration input. Thus, it is possible to eliminate an unnatural change of motion from a straight to a hook.

Furthermore, if "NO" in the step S11, that is, if the hook flag has already been turned on, the determination of the kind of the acceleration input thereafter is not required, and therefore, the process proceeds to the step S23.

Succeedingly, in the step S23, the CPU 44 executes drawing processing according to the drawing program. This allows the game processing corresponding to the kind of the acceleration input. The operation of the drawing processing is shown in FIG. 24.

Figure 24:
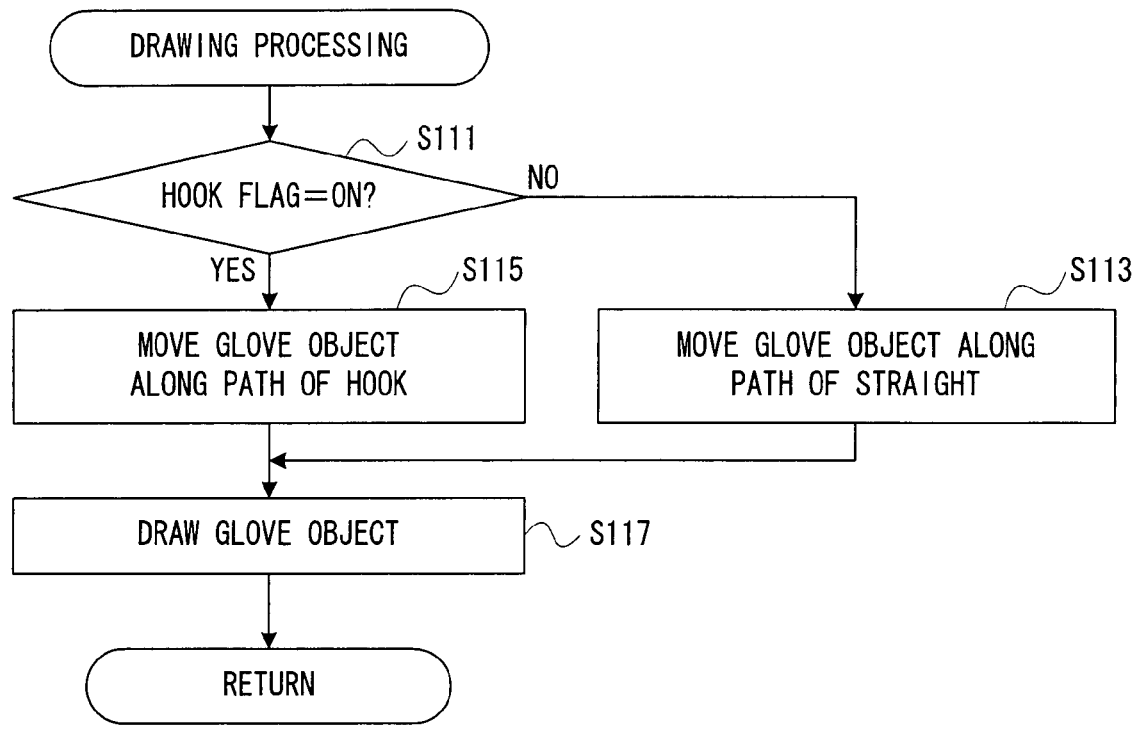
FIG. 24 is a flowchart showing one example of an operation of the drawing processing shown in FIG. 19.

When starting the drawing processing in FIG. 24, the CPU 44 determines whether or not the hook flag is turned on in a step S111. As described above, although the hook flag is turned off in the initial processing, if an acceleration input is determined to be a hook in the YZ determination processing or the XY determination processing, the hook flag is turned on. Additionally, an object whose movement is to be controlled in succeeding steps S113 and S115 is the glove object 204 indicated by the information in the memory area 132.

If "NO" in the step S111, the CPU 44 moves the glove object 204 along the path of the straight in the step S113. That is, the processing in the step S113 is a part of the game processing corresponding to the straight kind of the acceleration input, and this controls the glove object 204 to perform a motion (movement along the straight path). More specifically, a new position, a direction, etc. of the glove object 204 are calculated on the basis of the current position, the motion pattern data of a straight, etc.

On the other hand, if "YES" in the step S111, that is, if the kind of the acceleration input is a hook, the CPU 44 moves the glove object 204 along the path of the hook in a step S115. That is, the processing in the step S115 is a part of the game processing corresponding to the hook kind of the acceleration input, and this controls the glove object 204 to perform the motion corresponding to the hook (movement along the hook path). More specifically, a new position, a direction, etc. of the glove object 204 are calculated on the basis of the current position, motion pattern data of the hook, etc.

Succeedingly, in a step S117, the CPU 44 draws the glove object 204 by means of the GPU50. Thus, a game image including the glove object 204 being located in the position calculated in the step S113 or S115 is drawn and displayed on the monitor 30.

Thus, at a start of the acceleration input, as shown in FIG. 16, the game image in which the glove object 204 moves along the straight path is temporarily displayed. Thereafter, if it is determined that the acceleration input is a hook, a game image in which the glove object 204 moves along the hook path (that is, the player character 200 throws a hook punch) is displayed as shown in FIG. 18. Meanwhile, if it is not determined that the acceleration input is a hook after the predetermined time is elapsed, a game image in which the glove object 204 moves along the straight path (that is, the player character 200 throws a straight punch) is displayed as shown in FIG. 17.

After completion of the drawing process, the processing returns to a step S25 in FIG. 19. In the step S25 in FIG. 19, the CPU 44 adds one to the timer in the memory area 128. That is, the elapsed time (elapsed frame count) from the start of the acceleration input is counted.

Succeedingly, in a step S27, the CPU 44 determines whether or not throwing of the punch is to be ended. For example, it is determined whether or not drawing processing is executed for a predetermined time to end the drawing of the punch. If "NO" in the step S27, the processing returns to the step S11.

On the other hand, if "YES" in the step S27, the drawing of one punch is completed, and therefore, the CPU 44 determines whether or not the processing is to be ended in a step S29. For example, whether or not a physical strength of the player character 200 or the enemy character 202 becomes 0 is determined, and whether or not the predetermined number of rounds is ended is determined. If "NO" in the step S29, the process returns to the step S3 so as to continue the match. If "YES" in the step S29, the process is ended.

According to this embodiment, when the start of the acceleration input is detected, the first drawing processing corresponding to the first kind of the acceleration input is started to thereby draw an image in which the glove object 204 performs a motion corresponding to the first kind (movement along the path of the straight). That is, when an acceleration input is started by the player, an image in which the object performs a motion corresponding to the first kind of the acceleration input is immediately displayed on the screen. This makes it possible to draw the image with high response. Thereafter, when it is determined that the kind of the acceleration input is the second kind, the second drawing processing corresponding to the second kind is executed in place of the first drawing processing to draw an image in which the glove object 204 performs a motion corresponding to the second kind (movement along the hook path). Thus, it is possible to display on the screen an image in which the object makes an accurate movement according to the kind of the acceleration input actually performed by the player. In addition, when a predetermined time has elapsed from the start of the acceleration input, the determination of the kind of the acceleration input is not performed, and therefore, it is possible to prevent an unnatural change of motions from being performed, eliminating the possibility of giving the player uncomfortable feeling.

Furthermore, the kind of the acceleration input is determined on the basis of the characteristics of the changes in two-axis accelerations. Specifically, a reference timing at when the acceleration in the first-axis (X-axis) direction exceeds a predetermined threshold value to take on the minimum value or the maximum value is detected, and the acceleration change vectors V1 and V2 before and after the reference timing is calculated on the basis of the accelerations of the two-axis directions, and on the basis of the angle between the first vector V1 and the second vector V2, the kind of the acceleration input is identified. Accordingly, it is possible to reduce erroneous recognition due to the way of holding the controller 14.

Furthermore, in the above-described embodiment, the movement of the glove object 204 is controlled corresponding to the kind of the acceleration input. In another embodiment, a punch action of the player character 200 as one object may be controlled depending on the kind of the acceleration input.

Additionally, in each of the above-described embodiments, when an acceleration input is started, the game processing corresponding to the straight is started by assuming that the kind is a straight, and thereafter, whether or not the kind is a hook is determined. However, in another embodiment, assuming that the kind is a hook at a start, the game processing corresponding to the hook is started, and then, whether or not the kind is a straight may be determined.

Although the exemplary embodiment present herein has been described and illustrated in detail, it is clearly understood that the same is by way of illustration and example only and is not to be taken by way of limitation, the spirit and scope of the exemplary embodiment being limited only by the terms of the appended claims.

What is claimed is:

1. A storage medium storing a game program which causes a computer of a game apparatus including an input means having an acceleration sensor for detecting accelerations in at least two-axis directions to execute game processing in correspondence with a kind of an acceleration input by means of said input means, wherein said game program causes said computer to execute acceleration acquiring for acquiring accelerations detected by said acceleration sensor, reference timing detecting for detecting a reference timing indicative of timing when acceleration in a first-axis direction out of the accelerations in the two-axis directions acquired by said acceleration acquiring is below a predetermined threshold value to take on a minimum value or is above the predetermined threshold value to take on a maximum value, first vector calculating for calculating a first acceleration change vector on the basis of accelerations in said two-axis directions acquired at said reference timing and accelerations in said two-axis directions acquired at timing next to said reference timing, second vector calculating for calculating a second acceleration change vector on the basis of the accelerations in said two-axis directions acquired at said reference timing and accelerations in said two-axis directions acquired at timing before said reference timing, angle determining for determining whether or not an angle between said first acceleration change vector and said second acceleration change vector is equal to or more than a predetermined angle, and input kind determining for determining that said acceleration input is an acceleration input in any one of said two-axis directions when said angle determining determines that said angle is not equal to or more than said predetermined angle, and determining that said acceleration input is an acceleration input in a direction including said two-axis directions as components when said angle determining determines that said angle is equal to or more than said predetermined angle.

2. A game apparatus which includes an input means having an acceleration sensor for detecting accelerations in at least two-axis directions, and executes game processing in correspondence with a kind of an acceleration input by means of said input means, comprising:

acceleration acquiring programmed logic circuitry for acquiring accelerations detected by said acceleration sensor, reference timing detecting programmed logic circuitry for detecting a reference timing indicative of timing when acceleration in a first-axis direction out of the accelerations in the two-axis directions acquired by said acceleration acquiring programmed logic circuitry is below a predetermined threshold value to take on a minimum value or is above the threshold value to take on a maximum value, first vector calculating programmed logic circuitry for calculating a first acceleration change vector on the basis of accelerations in said two-axis directions acquired at said reference timing and accelerations in said two-axis directions acquired at timing next to said reference timing, second vector calculating programmed logic circuitry for calculating a second acceleration change vector on the basis of the accelerations in said two-axis directions acquired at said reference timing and accelerations in said two-axis directions acquired at timing before said reference timing, angle determining programmed logic circuitry for determining whether or not an angle between said first acceleration change vector and said second acceleration change vector is equal to or more than a predetermined angle, and input kind determining programmed logic circuitry for determining that said acceleration input is an acceleration input in any one of said two-axis directions when said angle determining programmed logic circuitry determines that said angle is not equal to or more than said predetermined angle, and determining that said acceleration input is an acceleration input in a direction including said two-axis directions as components when said angle determining means determines that said angle is equal to or more than said predetermined angle.

3. A game controlling method for executing, in a game apparatus including an input means having an acceleration sensor for detecting accelerations in at least two-axis directions, game processing according to a kind of an acceleration input by means of said input means, including:

acceleration acquiring for acquiring accelerations detected by said acceleration sensor, reference timing detecting for detecting a reference timing indicative of timing when acceleration in a first-axis direction out of the accelerations in the two-axis directions acquired by said acceleration acquiring is below a predetermined threshold value to take on a minimum value or is above the predetermined threshold value to take on a maximum value, first vector calculating for calculating a first acceleration change vector on the basis of accelerations in said two-axis directions acquired at said reference timing and accelerations in said two-axis directions acquired at timing next to said reference timing, second vector calculating for calculating a second acceleration change vector on the basis of the accelerations in said two-axis directions acquired at said reference timing and accelerations in said two-axis directions acquired at timing before said reference timing, angle determining for determining whether or not an angle between said first acceleration change vector and said second acceleration change vector is equal to or more than a predetermined angle, and input kind determining for determining that said acceleration input is an acceleration input in any one of said two-axis directions when said angle determining determines that said angle is not equal to or more than said predetermined angle, and determining that said acceleration input is an acceleration input in a direction including said two-axis directions as components when said angle determining determines that said angle is equal to or more than said predetermined angle.

* * * * *